United States Patent
Vail, III

(10) Patent No.: US 6,246,240 B1
(45) Date of Patent: *Jun. 12, 2001

(54) DETERMINING RESISTIVITY OF A FORMATION ADJACENT TO A BOREHOLE HAVING CASING WITH AN APPARATUS HAVING ALL CURRENT CONDUCTING ELECTRODES WITHIN THE CASED WELL

(75) Inventor: William Banning Vail, III, Bothell, WA (US)

(73) Assignee: Western Atlas International, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/310,312

(22) Filed: May 12, 1999

Related U.S. Application Data

(62) Division of application No. 08/738,924, filed on Oct. 28, 1996, now Pat. No. 6,025,721, and a continuation of application No. 08/083,615, filed on Jun. 28, 1993, now Pat. No. 5,570,024, and a continuation-in-part of application No. 07/754,965, filed on Sep. 4, 1991, now Pat. No. 5,223,794, and a division of application No. 07/434,886, filed on Nov. 13, 1989, now Pat. No. 5,075,626, and a continuation-in-part of application No. 07/089,697, filed on Aug. 26, 1987, now Pat. No. 4,882,542, and a continuation-in-part of application No. 06/927,115, filed on Nov. 4, 1986, now Pat. No. 4,820,989.

(51) Int. Cl.$^7$ .................................................. G01V 3/20
(52) U.S. Cl. ............................................................ 324/368
(58) Field of Search .......................... 324/368, 347–367, 324/369–375

(56) References Cited

U.S. PATENT DOCUMENTS

| | | |
|---|---|---|
| 2,371,658 | 3/1945 | Stewart . |
| 2,459,196 | 1/1949 | Stewart . |

(List continued on next page.)

FOREIGN PATENT DOCUMENTS

| | | |
|---|---|---|
| 0 434 439 A2 | 12/1990 | (EP) . |
| 0 618 463 A1 | 3/1994 | (EP) . |
| 0 656 547 A1 | 10/1994 | (EP) . |
| 2207278 | 11/1972 | (FR) . |
| 56026 | 11/1939 | (SU) . |

OTHER PUBLICATIONS

Vail, et al., "Proof of Feasibility of the Through Casing Resistivity Technology", Final Report to Gas Research Institute for Period of Apr. 15, 1988 through Oct. 1, 1989, GRI Contract No. 5088–212–1664, Feb. 1990.

Vail, et al., "Proof of Feasibility of the Thru Casing Resistivity Technology", Final Report to U.S. Department of Energy Period of Apr. 15, 1988 through Nov. 15, 1989, DOE Grant No. DE–FG19–88BC14243, Mar. 1990.

Vail, et al., "Formation Resistivity Measurements Through Metal Casing", SPWLA 34th Annual Logging Symposium, Jun. 13–16, 1993.

(List continued on next page.)

*Primary Examiner*—Walter E. Snow
(74) *Attorney, Agent, or Firm*—Sheridan Ross P.C.

(57) ABSTRACT

Methods of operation of different types of multiple electrode apparatus vertically disposed in a cased well to measure information useful to determine the resistivity of adjacent geological formations from within the cased well are described. The multiple electrode apparatus has a plurality of spaced apart voltage measurement electrodes that electrically engage a portion of the interior of the cased well. During measurements of information useful to determine formation resistivity, current is conducted between a first current conducting electrode in electrical contact with the interior of the cased well to a second current conducting electrode that is also in electrical contact with the interior of the cased well. The first and second current conducting electrodes are separated by a distance sufficient so that at least a portion of the current conducted between the first and second current conducting electrodes is conducted through the geological formation of interest.

22 Claims, 14 Drawing Sheets

U.S. PATENT DOCUMENTS

| | | |
|---|---|---|
| 2,729,784 | 1/1956 | Fearon . |
| 2,891,215 | 6/1959 | Fearon . |
| 4,748,415 | 5/1988 | Vail, III ............................... 324/339 |
| 4,796,186 * | 1/1989 | Kaufman ............................. 324/368 |
| 4,820,989 | 4/1989 | Vail, III ............................... 324/368 |
| 4,837,518 | 6/1989 | Gard et al. .......................... 324/368 |
| 4,857,831 | 8/1989 | Davies et al. .......................... 324/65 |
| 4,882,542 | 11/1989 | Vail, III ............................... 324/368 |
| 4,901,023 | 2/1990 | Vail, III ............................... 324/339 |
| 5,038,107 | 8/1991 | Gianzero et al. .................... 324/339 |
| 5,043,668 | 8/1991 | Vail, III ............................... 324/368 |
| 5,043,669 | 8/1991 | Vail, III ............................... 324/368 |
| 5,065,100 | 11/1991 | Vail, III ............................... 324/339 |
| 5,075,626 | 12/1991 | Vail, III ............................... 324/368 |
| 5,187,440 | 2/1993 | Vail, III ............................... 324/372 |
| 5,223,794 | 6/1993 | Vail, III ............................... 324/368 |
| 5,260,661 | 11/1993 | Vail, III ............................... 324/339 |
| 5,426,367 | 6/1995 | Martin et al. ....................... 324/339 |
| 5,510,712 | 4/1996 | Sezginer et al. .................... 324/368 |
| 5,563,514 | 10/1996 | Moulin ............................... 324/368 |
| 5,570,024 | 10/1996 | Vail, III ............................... 324/368 |
| 5,608,323 | 3/1997 | Koelman ............................. 324/368 |
| 5,633,590 | 5/1997 | Vail, III ............................... 324/368 |
| 5,654,639 | 8/1997 | Locatelli ............................. 324/339 |
| 5,717,334 | 2/1998 | Vail, III et al. ...................... 324/368 |

OTHER PUBLICATIONS

Vail, et al., "Formation Resistivity Measurements Through Metal Casing At The MWX–2 Well In Rifle, Colorado", SPWLA 36th Annual Logging Symposium, Jun. 26–29, 1995.

Vail, et al., "Through Casing Resistivity Measurements and Their Interpretation for Hydrocarbon Saturations", SPE Paper 30582, SPE Annual Technical Conference & Exhibition, Oct. 22–26, 1995, pp. 533–548.

Vail, et al., "Through Casing Resistivity Tool™ To Locate Bypassed Oil", The American Oil & Gas Reporter, Oct. 1995, pp. 70–76.

Vail, et al., "Proof of Feasibility of the Through Casing Resistivity Technology", Final Report, GRI–96/0133, Mar. 1996.

Schemph, "Through–casing Logging Tool Licensed to Atlas, Schlumberger", Improved Recovery Week, vol. 4, No. 20, May 22, 1995, pp. 1 and 6.

Klein, et al., "Cement Resistivity and Implications for Measurement of Formation Resistivity Through Casing", SPE Paper 26456, SPE Annual Technical Conference and Exhibition, Oct. 3–6, 1993.

Tabarovsky, et al., "Through–Casing Resistivity (TCR): Physics, Resolution and 3–D Effects", SPWLA 35th Annual Logging Symposium, Jun. 19–22, 1994.

Zinger, et al,. "Modeling of Electrical Effects of Borehole Casing Inhomogeneities", SEG International Exposition and 64th Annual Meeting, Oct. 23–28, 1994, pp. 399–402.

Singer, et al., "Through–Casing Resistivity: 2–D and 3–D Distortions and Correction Techniques", SPWLA 36th Annual Logging Symposium, Jun. 26–29, 1995.

Singer, et al., "Measurement of Formation Resistivity Through Steel Casing", SPE Paper 30628, SPE Annual Technical Conference and Exhibition, Oct. 22–26, 1995, pp. 999–1010.

Maurer, et al., "GRI Persues Goal of Commercial, Through–Casing Resistivity Measurement", GasTIPS, Fall 1996, pp. 10–13.

Zhang, et al., "Quick Look Inversion of Through–Casing Resistivity Measurement" Final Report to Gas Research Institute for Period of Jun. 1994 through May 1995, GRI Contract No. 5094–210–3017, GRI–96/0001, Feb. 1996.

Kaufman, "The Electrical Field in a Borehole With A Casing", Geophysics, vol. 55, No. 1, Jan. 1990, pp. 29–38.

Kaufman, et al., "A Transmission–line Model For Electrical Logging Through Casing", Geophysics, vol. 58, No. 12, Dec. 1993, pp. 1739–1747.

Kaufman, et al., "Influence of Inductive Effect on Measurements of Resistivity Through Casing", Geophysics, vol. 61, No. 1, Jan.–Feb. 1996, pp. 34–42.

Schenkel, et al., "Numerical Study on Measuring Electrical Resistivity Through Casing in a Layered Medium", Society of Exploration Geophysicists 60th Annual International Meeting & Exposition, Sep. 23–27, 1990, pp. 538–541.

Schenkel, et al., "Electrical Resistivity Measurement Through Metal Casing", Geophysics, vol. 59, No. 7 (Jul. 1994) pp. 1072–1082.

Schenkel "DC Resistivity Imaging Using a Steel Cased Well", Society of Exploration Geophysicists 64th Annual International Meeting & Exposition, Oct. 23–28, 1994, pp. 403–406.

Mamedov, et al., "Effectiveness of Resistivity Logging of Cased Wells by a Six–Electrode Tool", IZV-.VYSSH.UCHEB, ZAVEDENII, NEFT GAZ No. 7, Jul. 1987, pp. 11–15 (ISSN 0445–0108). Unofficial English translation stapled in front of original Russian Text.

"Device That 'Sees' Through Well Casings Could Find Missed Oil, Gas", Fossil Energy Review, Jul.–Aug. 1989, pp. 12–13.

"U.S. Energy Officials Hail New Tool For Finding Oil", Investor's Daily, Sep. 5, 1989, p. 9.

"Cased Hole Resistivity Logging System Advancing", Oil & Gas Journal, Sep. 11, 1989, p. 24.

"Searching for Hidden Oil and Gas", The New York Times, Jan. 28, 1990, F 8.

Bell, T.E., "Case Study: Seeing Through Walls", IEEE Spectrum, Jan. 1990, p. 19.

Maute, "Electrical Logging: State–of–the–Art", The Log Analyst, vol. 33, No. 3, May–Jun., 1992, pp. 212–213.

"Through–Casing Logging: GRI Research Aims to Tap Lowest–Cost Gas Resource", Gas Research Institute, Sep. 1992, p. 1–5.

Schemph, "Through–casing Resistivity Tool Set for Permian Use", Improved Recovery Week, vol. 1, No. 32, Sep. 28, 1992, pp. 1,4, and 6.

"Through–Casing Resistivity Well Logging Technology" Technology Transfer 92/93, DOE/ST–0005P DE93003623, p. 83.

Mitchell, "High Tech Woodinville: ParaMagnetic Logging Searches for Oil", The Woodinville Weekly, May 24, 1993, p. 21.

Bell, S., "Logging Tool Gives Resistivity Measurements Through Casing", Petroleum Engineer International, vol. 66, No. 11, Nov. 1994, p. 9.

"Small Company's Novel Idea for Oil, gas Producers Becoming Government–Industry R&D Success Story", TechLine #3037, U.S. Department of Energy, Office of Fossil Energy, Apr. 28, 1995.

"New Tool Detects Hydrocarbons Behind Pipe", Oil & Gas Journal, May 15, 1995, p. 58, and correction, May 29, 1995, p. 20.

Bell, S., "Advanced Logging Technology Helps Locate Bypassed Reserves", Energy Perspectives, Noble Drilling Corporation, vol. 2, No. 1, Jul. 1995, pp. 5–6.

"There's Oil Near Them Thar Wells", Business Week, Sep. 25, 1995, p. 140.

LeLeux, "Through–casing Electrical Log Can Locate Bypassed Reserves", World Oil, Nov. 1995, reprint pp. 1–4.

Warren, "In My Opinion", Journal of Petroleum Technology, Dec. 1995, p. 1031.

Bell, S., "Operators Convey Optimism in Cased–Hole Resistivity Measurements", Petroleum Engineer International, Dec. 1995, p. 53–54.

"Through–Casing Logging For Oil/Gas Wells", U.S. Department of Energy—Office of Fossil Energy, DOE No. DOE/FE–0328C, 1995.

* cited by examiner

DETERMINING RESISTIVITY OF A FORMATION ADJACENT TO A BOREHOLE HAVING CASING WITH AN APPARATUS HAVING ALL CURRENT CONDUCTING ELECTRODES WITHIN THE CASED WELL

This application is a Continuation-in-Part Application of a Divisional Application that is entitled "Determining Resistivity of a Formation Adjacent to a Borehole Having Casing by Generating Constant Current Flow in Portion of Casing and Using at Least Two Voltage Measurement Electrodes"; which is Ser. No. 08/738,924; which has the filing date of Oct. 28, 1996; and which issued as U.S. Pat. No. 6,025,721. An entire copy of Ser. No. 08/738,924 is included herein by reference.

Ser. No. 08/738,924 is a Divisional application of a Continuation-in-Part application that is entitled "Determining Resistivity of a Formation Adjacent to a Borehole Having Casing Using Multiple Electrodes and With Resistances Being Defined Between the Electrodes"; which is Ser. No. 08/083,615; which has the filing date of Jun. 28, 1993; and which issued on Oct. 29, 1996 as U.S. Pat. No. 5,570,024 {"Vail(024)"}. An entire copy of Ser. No. 08/083,615 is included herein by reference.

Ser. No. 08/083,615 is a Continuation-in-Part application of an earlier Divisional application that is entitled "Methods of Operation of Apparatus Measuring Formation Resistivity From Within a Cased Well Having One Measurement and Two Compensation Steps"; which is Ser. No. 07/754,965; which has the filing date of Sep. 4, 1991; and that issued on Jun. 29, 1993 as U.S. Pat. No. 5,223,794 {"Vail(794)"}. A entire copy of Ser. No. 07/754,965 is included herein by reference.

Ser. No. 07/754,965 is a Divisional application of an earlier Continuation-in-Part application that is entitled "Electronic Measurement Apparatus Movable In a Cased Borehole and Compensating for Casing Resistance Differences"; which is Ser. No. 07/434,886; which has the filing date of Nov. 13, 1989; and which issued on Dec. 24, 1991 as U.S. Pat. No. 5,075,626 {"Vail(626)"}. An entire copy of Ser. No. 07/434,886 is included herein by reference.

Ser. No. 07/434,886 is a Continuation-in-Part application of an earlier Continuation-in-Part application having the title of "Methods and Apparatus for Measurement of Electronic Properties of Geological Formations Through Borehole Casing"; which is Ser. No. 07/089,697; which has the filing date of Aug. 26, 1987; and which issued on Nov. 21, 1989 as U.S. Pat. No. 4,882,542 {"Vail(542)"}. An entire copy of Ser. No. 07/089,697 is included herein by reference.

Ser. No. 07/089,697 is a Continuation-in-Part application of the original Parent application having the title "Methods and Apparatus for Measurement of the Resistivity of Geological Formations from Within Cased Boreholes"; which is Ser. No. 06/927,115; which has the filing date of Nov. 4, 1986; and which issued on Apr. 11, 1989 as U.S. Pat. No. 4,820,989 {"Vail(989)"}. An entire copy of Ser. No. 06/927,115 is included herein by reference.

The above paragraphs define a total of 5 issued U.S. Patents, and 1 co-pending U.S. Patent Application, that show the "direct chain" of applications leading to the application herein.

However, there are an additional 5 U.S. Patents that have issued that are related to this application. In addition, there are yet 2 more U.S. Patent Applications that are co-pending in the USPTO that are related to this case. These are defined in the following, respectively enumerated as (i), (ii), (iii), (iv), (v), (vi) and (vii).

(i) U.S. Pat. No. 5,043,669 {"Vail(669)"} entitled "Methods and Apparatus for Measurement of the Resistivity of Geological Formations From Within Cased Wells in Presence of Acoustic and Magnetic Energy Sources"; that issued on Aug. 27, 1991; that is Ser. No. 07/438,268; that has the filing date of Nov. 16, 1989; and that is a Continuation-in-Part application of Ser. No. 07/089,697. An entire copy of Ser. No. 07/438,268 is included herein by reference.

(ii) U.S. Pat. No. 5,043,668{"Vail(668)"} entitled "Methods and Apparatus for Measurement of Electronic Properties of Geological Formations Through Borehole Casing"; that issued on Aug. 27, 1991; that is Ser. No. 07/435,273; that has the filing date of Oct. 30, 1989; and that is a Continuation application of Ser. No. 07/089,697. An entire copy of Ser. No. 07/435,273 is included herein by reference.

(iii) U.S. Pat. No. 5,187,440 {"Vail(440)"} entitled "Measuring Resistivity Changes From Within a First Cased Well to Monitor Fluids Injected Into Oil Bearing Geological Formations From a Second Cased Well While Passing Electrical Current Between the Two Cased Wells"; that issued on Feb. 16, 1993; that is Ser. No. 07/749,136; that has the filing date of Aug. 23, 1991; and that is a Continuation-in-Part application of Ser. No. 07/435,273. An entire copy of Ser. No. 07/749,136 is included herein by reference.

(iv) U.S. Pat. No. 5,633,590 {"Vail (590)"} entitled "Formation Resistivity Measurements from Within a Cased Well Used to Quantitatively Determine the Amount of Oil and Gas Present"; that issued on May 27, 1997; that is Ser. No. 08/214,648; that has the filing date of Mar. 17, 1994; and that is a Continuation-in-Part application of Ser. No. 08/083,615. An entire copy of Ser. No. 08/214,628 is included herein by reference.

(v) U.S. Pat. No. 5,717,334 {"Vail (334)"} entitled "Methods and Apparatus to Produce Stick-Slip Motion of Logging Tool Attached to a Wireline Drawn Upward by a Continuously Rotating Wireline Drum"; that issued on Feb. 10, 1998; that is Ser. No. 08/508,781; that has the filing date of Jul. 28, 1995; that is a Continuation-in-Part application of Ser. No. 08/083,615. An entire copy of Ser. No. 08/508,781 is included herein by reference.

(vi) Co-pending application Ser. No. 08/685,796 entitled "Electrical Voltages and Resistances Measured to Inspect Metallic Cased Wells and Pipelines"; that has the filing date of Jul. 23, 1996; that is an FWC Application of Ser. No. 08/271,869 (now abandoned); and Ser. No. 08/271,869 is a Continuation-in-Part application of Ser. No. 08/083,615. An entire copy of Ser. No. 08/685,796 is included herein by reference.

(vii) Co-pending application Ser. No. 08/864,309 entitled "Formation Resistivity Measurements from Within a Cased Well Used to Quantitatively Determine the Amount of Oil and Gas Present"; that has the filing date of May 27, 1997; that is a Continuation application of Ser. No. 08/214,648. An entire copy of Ser. No. 08/864,309 is included herein by reference.

This invention was made with Government support under DOE Grant No. DE-FG06-84ER13294, entitled "Validating the Paramagnetic Logging Effect", Office of Basic Energy Sciences, of the U.S. Department of Energy. The government has certain rights in this invention. The basic concept for the invention described herein was conceived during the funding provided by the above grant.

Ongoing research to measure resistivity through casing has been provided on a co-funded basis from: (a) U.S. Department of Energy Grant No. DE-FG19-88BC14243 entitled "Proof of Feasibility of Thru Casing Resistivity Technology"; (b) U.S. Department of Energy (DOE) Grant No. DE-FG22-90BC14617 entitled "Proof of Concept of Moving Thru Casing Resistivity Apparatus"; (c) U.S. Department of Energy Grant No. DE-FG22-93BC14966 entitled "Fabrication and Downhole Testing of Moving Through Casing Resistivity Apparatus"; and (d) Gas Research Institute (GRI) Contract No. 5088-212-1664 entitled "Proof of Feasibility of the Through Casing Resistivity Technology". The government and the GRI have certain rights in this invention.

Portions of this application have been disclosed in U.S. Disclosure Document No. 228495, filed Jun. 5, 1989, an entire copy of which is included herein by reference. Other U.S. Disclosure Documents related to this application have been filed in the USPTO, and entire copies of all of those U.S. Disclosure Documents are included herein by reference (and those U.S. Disclosure Document numbers shall be provided by applicant in a later amendment to be filed by applicant).

This invention provides improved methods and apparatus for measurement of the electronic properties of formations such as the resistivities, polarization phenomena, and dielectric constants of geological formations and cement layers adjacent to cased boreholes and for measuring the skin effect of the casing present. The terms "electronic properties of formations" and "electrochemical properties of formations" are used interchangeably herein.

The oil industry has long sought to measure resistivity through casing. Such resistivity measurements, and measurements of other electrochemical phenomena, are useful for at least the following purposes: locating bypassed oil and gas; reservoir evaluation; monitoring water floods; measuring quantitative saturations; cement evaluation; permeability measurements; and measurements through a drill string attached to a drilling bit. Therefore, measurements of resistivity and other electrochemical phenomena through metallic pipes, and steel pipes in particular, are an important subject in the oil industry. Many U.S. patents have issued in the pertinent Subclass 368 of Class 324 of the United States Patent and Trademark Office which address this subject. The following presents a brief description of the particularly relevant prior art presented in the order of descending relative importance.

U.S. Patents which have already issued to the inventor in the is field are listed as follows:

U.S. Pat. No. 4,820,989 (Ser. No. 06/927,115);
U.S. Pat. No. 4,882,542 (Ser. No. 07/089,697);
U.S. Pat. No. 5,043,668 (Ser. No. 07/435,273);
U.S. Pat. No. 5,043,669 (Ser. No. 07/438,268);
U.S. Pat. No. 5,075,626 (Ser. No. 07/434,886);
U.S. Pat. No. 5,187,440 (Ser. No. 07/749,136);
U.S. Pat. No. 5,223,794 (Ser. No. 07/754,965);
U.S. Pat. No. 5,570,024 (Ser. No. 08/083,615);
U.S. Pat. No. 5,633,590 (Ser. No. 08/214,648); and
U.S. Pat. No. 5,717,334 (Ser. No. 08/508,781).

As of the filing date of the application herein, the inventor's currently co-pending U.S. Patent Applications in this field are listed as follows:

Ser. No. 08/738,924 that is to issue shortly;
Ser. No. 08/685,796 that is to also issue shortly; and
Ser. No. 08/864,309 that is co-pending with the application herein.

The above 10 issued U.S. Patents, and any of the additional cases when they issue, are collectively identified as "the Vail Patents" for the purposes herein. For the record, entire copies of each and every one of the above 13 cases identified by serial number are included herein in their entirety by reference.

The apparatus and methods of operation herein disclosed are embodiments of the Through Casing Resistivity Tool® that is abbreviated TCRT®. The Through Casing Resistivity Tool® and TCRT® are Trademarks of ParaMagnetic Logging, Inc. in the United States Patent and Trademark Office.

An important publication concerning the Through Casing Resistivity Tool (TCRT) and the Vail Patents is the article entitled "Formation Resistivity Measurements Through Metal Casing", having authors of W. B. Vail and S. T. Momii of ParaMagnetic Logging, Inc., R. Woodhouse of Petroleum and Earth Science Consulting, M. Alberty and R. C. A. Peveraro of BP Exploration, and J. D. Klein of Arco Exploration and Production Technology, which appeared as Paper "F", Volume I, in the Transactions of the SPWLA Thirty-Fourth Annual Logging Symposium, Calgary, Alberta, Canada, Jun. 13–16, 1993, sponsored by The Society of Professional Well Log Analysts, Inc. of Houston, Tex. and the Canadian Well Logging Society of Calgary, Alberta, Canada (13 pages of text and 8 additional figures); an entire copy of which is included herein by reference. Experimental results are presented therein which confirm that the apparatus and methods disclosed the Vail Patents actually work in practice to measure the resistivity of geological formations adjacent to cased wells. To the author's knowledge, this SPWLA paper presents the first accurate measurements of resistivity obtained from within cased wells using any previous experimental apparatus.

Another important publication related to the Vail Patents is the article entitled "Formation Resistivity Measurements Through Metal Casing at the MWX-2 Well in Rifle, Colo.", having the authors of W. B. Vail and S. T. Momii of ParaMagnetic Logging, Inc., H. Haines of Gas Research Institute, J. F. Gould, Jr. of Mobil Exploration & Producing U.S., and W. D. Kennedy of the Mobil Research and Development Corporation, which appeared as Paper "OO" in the SPWLA 36th Annual Logging Symposium, Paris, France, Jun. 26–29, 1995, Sponsored by The Society of Professional Well Log Analysts, Inc., 12 pages including FIGS. 1–5, an entire copy of which is included herein by reference.

Yet another important publication related to the Vail Patents is the article entitled "Through Casing Resistivity Measurements and Their Interpretation for Hydrocarbon Saturations", having the authors of W. B. Vail and S. T. Momii of ParaMagnetic Logging, Inc., and J. T. Dewan of Dewan & Timko, Inc., that is SPE Paper 30582, presented at the SPE Annual Technical Conference & Exhibition, Dallas, Tex., Oct. 22–26, 1995, pages 533–548, including FIGS. 1–18, an entire copy of which is included herein by reference.

Yet another important publication related to the Vail Patents is the article entitled "Through Casing Resistivity Tool™ To Locate Bypassed Oil", having the authors of W. Banning Vail, Steven T. Momii, and Richard Woodhouse, that appeared in The American Oil & Gas Reporter, October, 1995, pages 70–76, including FIGS. 1–3, an entire copy of which is included herein by reference.

And yet another extensive publication related to the Vail Patents is the document entitled "Proof of Feasibility of the Through Casing Resistivity Technology", that is the Final Report to Gas Research Institute for research work performed from the dates of April 1988 to March 1994 under GRI Contract No. 5088-212-1664, having the authors of W. B. Vail and S. T. Momii of ParaMagnetic Logging, March, 1996, having a total of 328 pages and 169 figures, an entire copy of which is included herein by reference. This Final Report dated March, 1996 is a revised version of an earlier document entitled "First Draft of the Final Report to GRI" and dated Jul. 4, 1994, an entire copy of which is also incorporated herein by reference.

The Vail Patents describe the various embodiments of the Through Casing Resistivity Tool® (TCRT®). Many of these Vail Patents describe embodiments of apparatus having three or more spaced apart voltage measurement electrodes which engage the interior of the casing, and which also have calibration means to calibrate for thickness variations of the casing and for errors in the placements of the voltage measurement electrodes.

U.S. Pat. No. 4,796,186 which issued on Jan. 3, 1989 to Alexander A. Kaufman entitled "Conductivity Determination in a Formation Having a Cased Well" also describes apparatus having three or more spaced apart voltage measurement electrodes which engage the interior of the casing and which also have calibration means to calibrate for thickness variations in the casing and for errors in the placements of the electrodes. This patent has been assigned to ParaMagnetic Logging, Inc. of Woodinville, Wash. In general, different methods of operation and analysis are described in the Kaufman Patent compared to the Vail Patents cited above.

U.S. Pat. No. 4,837,518 which issued on Jun. 6, 1989 to Michael F. Gard, John E. E. Kingman, and James D. Klein, assigned to the Atlantic Richfield Company, entitled "Method and Apparatus for Measuring the Electrical Resistivity of Geologic Formations Through Metal Drill Pipe or Casing", predominantly describes two voltage measurement electrodes and several other current introducing electrodes disposed vertically within a cased well which electrically engage the wall of the casing, henceforth referenced as "the Arco Patent". However, the Arco Patent does not describe an apparatus having three spaced apart voltage measurement electrodes and associated electronics which takes the voltage differential between two pairs of the three spaced apart voltage measurement electrodes to directly measure electronic properties adjacent to formations. Nor does the Arco Patent describe an apparatus having at least three spaced apart voltage measurement electrodes wherein the voltage drops across adjacent pairs of the spaced apart voltage measurement electrodes are simultaneously measured to directly measure electronic properties adjacent to formations. Therefore, the Arco Patent does not describe the methods and apparatus disclosed herein.

USSR Patent No. 56,026, which issued on Nov. 30, 1939 to L. M. Alpin, henceforth called the "Alpin Patent", which is entitled "Process of the Electrical Measurement of Well Casings", describes an apparatus which has three spaced apart voltage measurement electrodes which positively engage the interior of the casing. However, the Alpin Patent does not have any suitable calibration means to calibrate for thickness variations of the casing nor for errors related to the placements of the voltage measurement electrodes. Therefore, the Alpin Patent does not describe the methods and apparatus disclosed herein.

French Patent No. 2,207,278 having a "Date of Deposit" of Nov. 20, 1972 (hereinafter "the French Patent") describes apparatus having four spaced apart voltage measurement electrodes which engage the interior of borehole casing respectively defined as electrodes M, N, K, and L. Various uphole and downhole current introducing electrodes are described. Apparatus and methods of operation are provided that determines the average resistance between electrodes M and L. This French Patent further explicitly assumes an exponential current flow along the casing. Voltage measurements across pair MN and KL are then used to infer certain geological parameters from the assumed exponential current flow along the casing. However, the French Patent does not teach measuring a first casing resistance between electrodes MN, does not teach measuring a second casing resistance between electrodes NK, and does not teach measuring a third casing resistance between electrodes KL. The invention herein and other preferred embodiments described in the Vail Patents teach that it is of importance to measure said first, second, and third resistances to compensate current leakage measurements for casing thickness variations and for errors in placements of the voltage measurement electrodes along the casing to provide accurate measurements of current leakage into formation. Further, many embodiments of the Vail Patents do not require any assumption of the form of current flow along the casing to measure current leakage into formation. Therefore, for these reasons alone, the French Patent does not describe the methods and apparatus disclosed herein. There are many other differences between various embodiments of the Vail Patents and the French Patent which are described in great detail in the Statement of Prior Art for Ser. No. 07/754,965 dated Dec. 2, 1991 that issued as U.S. Pat. No. 5,223,794 on Jun. 29, 1993.

An abstract of an article entitled "Effectiveness of Resistivity Logging of Cased Wells by A Six-Electrode Tool" by N. V. Mamedov was referenced in TULSA ABSTRACTS as follows: "IZV.VYSSH.UCHEB, ZAVEDENII, NEFT GAZ no.7, pp. 11–15, July 1987. (ISSN 0445-0108; 5 refs; in Russian)", hereinafter the "Russian Article". It is the applicant's understanding from an English translation of that Russian Article that the article itself mathematically predicts the sensitivity of the type tool described in the above defined French Patent. The Russian Article states that the tool described in the French Patent will only be show a "weak dependence" on the resistivity of rock adjacent to the cased well. By contrast, many embodiments of the Vail Patents, and the invention herein, provide measurements of leakage current and other parameters which are strongly dependent upon the resistivity of the rock adjacent to the cased well. Therefore, this Russian Article does not describe the methods and apparatus disclosed herein.

U.S. Pat. No. 2,729,784, issued on Jan. 3, 1956 having the title of "Method and Apparatus for Electric Well Logging", and U.S. Pat. No. 2,891,215 issued on Jun. 16, 1959 having the title of "Method and Apparatus for Electric Well Logging", both of which issued in the name of Robert E. Fearon, henceforth called the "Fearon Patents", describe apparatus also having two pairs of voltage measurement electrodes which engage the interior of the casing. However, an attempt is made in the Fearon Patents to produce a "virtual electrode" on the casing in an attempt to measure leakage current into formation which provides for methods and apparatus which are unrelated to the Kaufman and Vail Patents cited above. The Fearon Patents neither provide calibration means, nor do they provide methods similar to those described in either the Kaufman Patent or the Vail Patents, to calibrate for thickness variations and errors in the placements of the electrodes. Therefore, the Fearon Patents do not describe the methods and apparatus disclosed herein.

Accordingly, an object of the invention is to provide new and practical apparatus having three or more spaced apart voltage measurement electrodes to measure formation resistivity from within cased wells.

It is yet another object of the invention is to provide new methods of operation of the multi-electrode apparatus to measure formation from within cased wells which compensates for casing resistance differences and which compensates for errors in placements of the voltage measurement electrodes.

And it is yet another object of the invention to provide an apparatus, and suitable methods of operation, to determine the resistivity of a formation adjacent to a borehole having casing with an apparatus having all current conducting electrodes located within the cased well.

Figure 13:
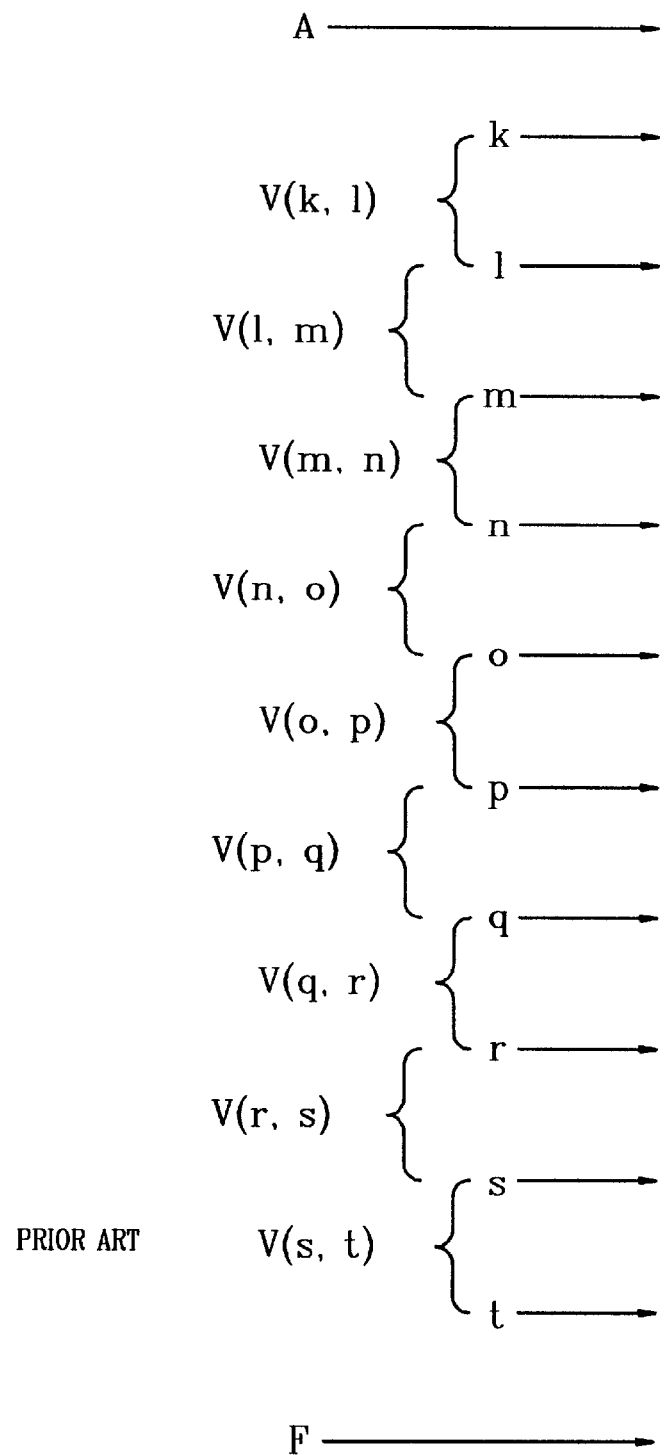

FIG. 13 is functionally identical to FIG. 26 from Ser. No. 07/089,697 that is U.S. Pat. No. 4,882,542, showing an apparatus having multiple voltage measurement electrodes engaging the interior of the casing that is marked with the legend "Prior Art".

Figure 14:
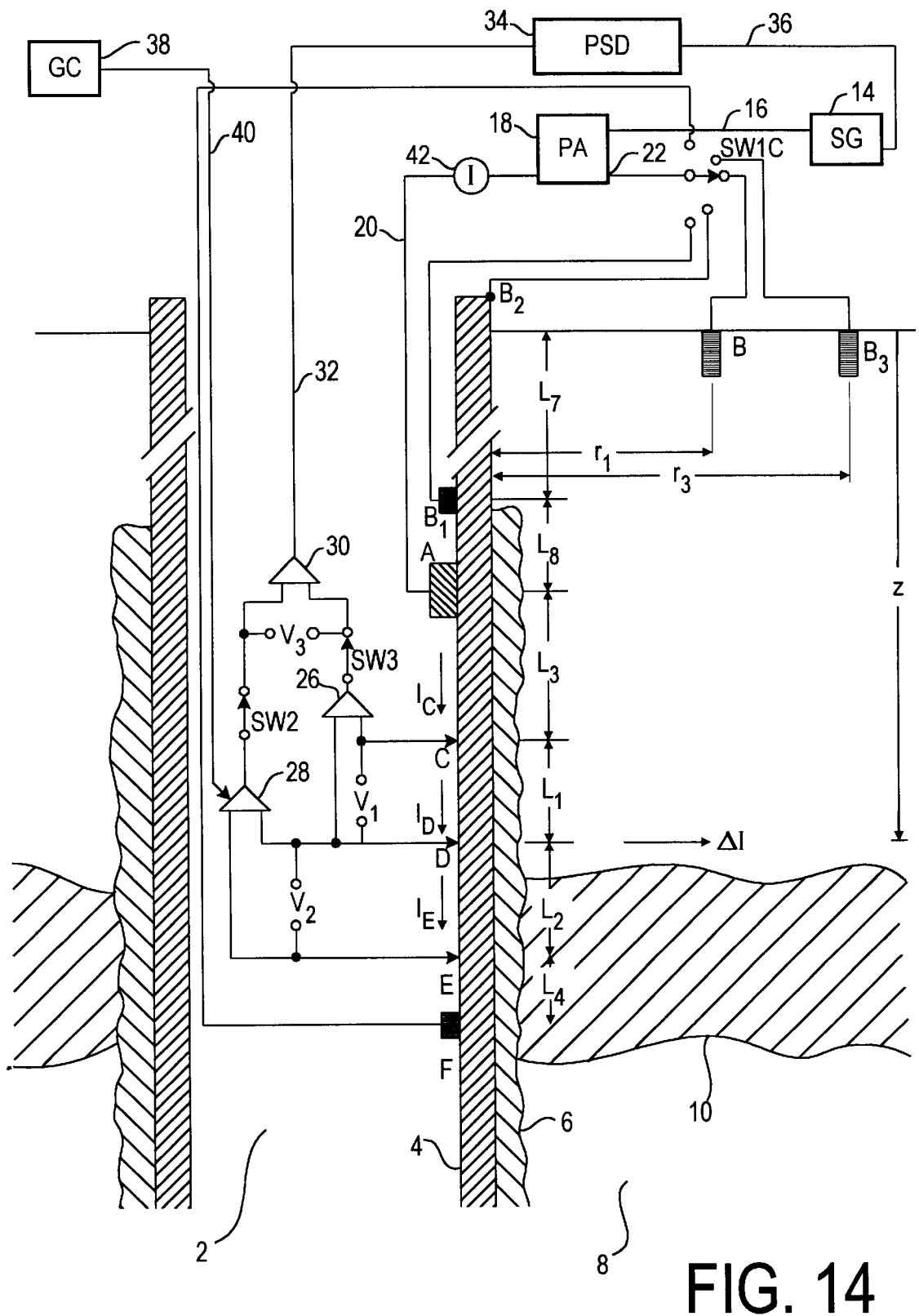

FIG. 14 is identical to FIG. 24 from Ser. No. 07/089,697 that is U.S. Pat. No. 4,882,542 that shows an apparatus for determining the resistivity of a formation adjacent to a borehole having casing wherein all current conducting electrodes are located within the cased well when element 22 is connected through SW1C to electrode $B_1$. It is marked with the legend "Prior Art".

The invention is described in three major different portions of the specification. In the first major portion of the specification, relevant parts of the text in Ser. No. 07/089,697 {Vail (542)} are repeated herein which describe apparatus defined in FIGS. 1, 3, 4, and 5. The second major portion of the specification quotes relevant parts of Ser. No. 07/434,886 {Vail (626)} that describe the apparatus defined in FIG. 6. The third major portion of the specification herein is concerned with providing multi-electrode apparatus and methods of operation of the multi-electrode apparatus to measure formation resistivity from within cased wells that compensates for casing resistance differences and for errors in placements of the various voltage measurement electrodes. The definitions provided in FIGS. 1 through 6 are used to conveniently define many of the symbols appearing in FIGS. 7 through 12.

Figure 1:
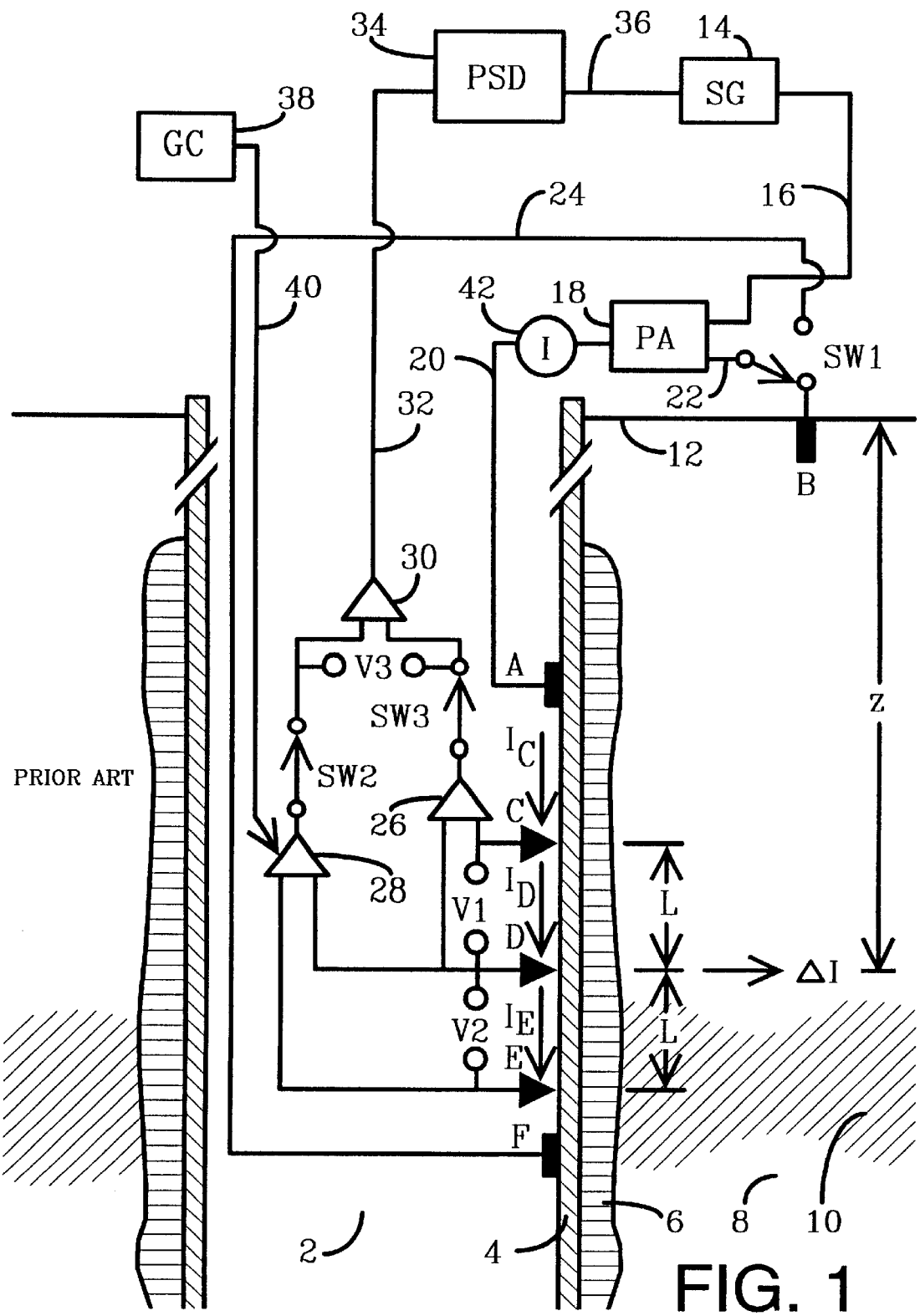
FIG. 1 is a sectional view of one preferred embodiment of the invention of the Through Casing Resistivity Tool (TCRT) which is marked with the legend "Prior Art".

From a technical drafting point of view, FIGS. 1, 2, 3, 4, and 5 in Ser. No. 07/089,697 {Vail (542)} and in those contained in this application are nearly identical. However, the new drawings have been re-done using computer graphics and the A-4 International Size. The following excerpt is taken word-for-word from Ser. No. 07/089,697:

"FIG. 1 shows a typical cased borehole found in an oil field. The borehole 2 is surrounded with borehole casing 4 which in turn is held in place by cement 6 in the rock formation 8. An oil bearing strata 10 exists adjacent to the cased borehole. The borehole casing may or may not extend electrically to the surface of the earth 12. A voltage signal generator 14 (SG) provides an A.C. voltage via cable 16 to power amplifier 18 (PA). The signal generator represents a generic voltage source which includes relatively simple devices such as an oscillator to relatively complex electronics such as an arbitrary waveform generator. The power amplifier 18 is used to conduct A.C. current down insulated electrical wire 20 to electrode A which is in electrical contact with the casing. The current can return to the power amplifier through cable 22 using two different paths. If switch SW1 is connected to electrode B which is electrically grounded to the surface of the earth, then current is conducted primarily from the power amplifier through cable 20 to electrode A and then through the casing and cement layer and subsequently through the rock formation back to electrode B and ultimately through cable 22 back to the power amplifier. In this case, most of the current is passed through the earth. Alternatively, if SW1 is connected to insulated cable 24 which in turn is connected to electrode F, which is in electrical contact with the casing, then current is passed primarily from electrode A to electrode F along the casing for a subsequent return to the power amplifier through cable 22. In this case, little current passes through the earth.

Electrodes C, D, and E are in electrical contact with the interior of casing. In general, the current flowing along the casing varies with position. For example, current $I_C$ is flowing downward along the casing at electrode C, current $I_D$ is flowing downward at electrode D, and current $I_E$ is flowing downward at electrode E. In general, therefore, there is a voltage drop V1 between electrodes C and D which is amplified differentially with amplifier 26. And the voltage difference between electrodes D and E, V2, is also amplified with amplifier 28. With switches SW2 and SW3 in their closed position as shown, the outputs of amplifiers 26 and 28 respectively are differentially subtracted with amplifier 30. The voltage from amplifier 30 is sent to the surface via cable 32 to a phase sensitive detector 34. The phase sensitive detector obtains its reference signal from the signal generator via cable 36. In addition, digital gain controller 38 (GC) digitally controls the gain of amplifier 28 using cable 40 to send commands downhole. The gain controller 38 also has the capability to switch the input leads to amplifier 28 on command, thereby effectively reversing the output polarity of the signal emerging from amplifier 28 for certain types of measurements.

The total current conducted to electrode A is measured by element 42. In the preferred embodiment shown in FIG. 1, the A.C. current used is a symmetric sine wave and therefore in the preferred embodiment, I is the 0-peak value of the A.C. current conducted to electrode A. (The 0-peak value of a sine wave is ½ the peak-to-peak value of the sine wave.)

In general, with SW1 connected to electrode B, current is conducted through formation. For example, current ΔI is conducted into formation along the length 2L between electrodes C and E. However, if SW1 is connected to cable 24 and subsequently to electrode F, then no current is conducted through formation to electrode B. In this case, $I_C=I_D=I_E$ since essentially little current ΔI is conducted into formation.

It should be noted that if SW1 is connected to electrode B then the current will tend to flow through the formation and not along the borehole casing. Calculations show that for 7 inch O.D. casing with a ½ inch wall thickness that if the formation resistivity is 1 ohm-meter and the formation is uniform, then approximately half of the current will have flowed off the casing and into the formation along a length of 320 meters of the casing. For a uniform formation with a resistivity of 10 ohm-meters, this length is 1040 meters instead." These lengths are respectively called "Characteristic Lengths" appropriate for the average resistivity of the formation and the type of casing used. A Characteristic Length is related to the specific length of casing necessary for conducting on approximately one-half the initial current into a particular geological formation as described below.

One embodiment of the invention described in Ser. No. 07/089,697 {Vail (542)} provides a preferred method of operation for the above apparatus as follows: "The first step in measuring the resistivity of the formation is to "balance" the tool. SW1 is switched to connect to cable 24 and subsequently to electrode F. Then A.C. current is passed from electrode A to electrode F thru the borehole casing. Even though little current is conducted into formation, the voltages V1 and V2 are in general different because of thickness variations of the casing, inaccurate placements of the electrodes, and numerous other factors. However, the gain of amplifier 28 is adjusted using the gain controller so that the differential voltage V3 is nulled to zero. (Amplifier 28 may also have phase balancing electronics if necessary to achieve null at any given frequency of operation.) Therefore, if the electrodes are subsequently left in the same place after balancing for null, spurious effects such as thickness variations in the casing do not affect the subsequent measurements.

With SW1 then connected to electrode B, the signal generator drives the power amplifier which conducts current to electrode A which is in electrical contact with the interior of the borehole casing. A.C. currents from 1 amp o-peak to 30 amps o-peak at a frequency of typically 1 Hz are introduced on the casing here. The low frequency operation is limited by electrochemical effects such as polarization phenomena and the invention can probably be operated down to 0.1 Hz and the resistivity still properly measured. The high frequency operation is limited by skin depth effects of the casing, and an upper frequency limit of the invention is probably 20 Hz for resistivity measurements. Current is subsequently conducted along the casing, both up and down the casing from electrode A, and some current passes through the brine saturated cement surrounding the casing and ultimately through the various resistive zones surrounding the casing. The current is then subsequently returned to the earth's surface through electrode B."

Figure 2:
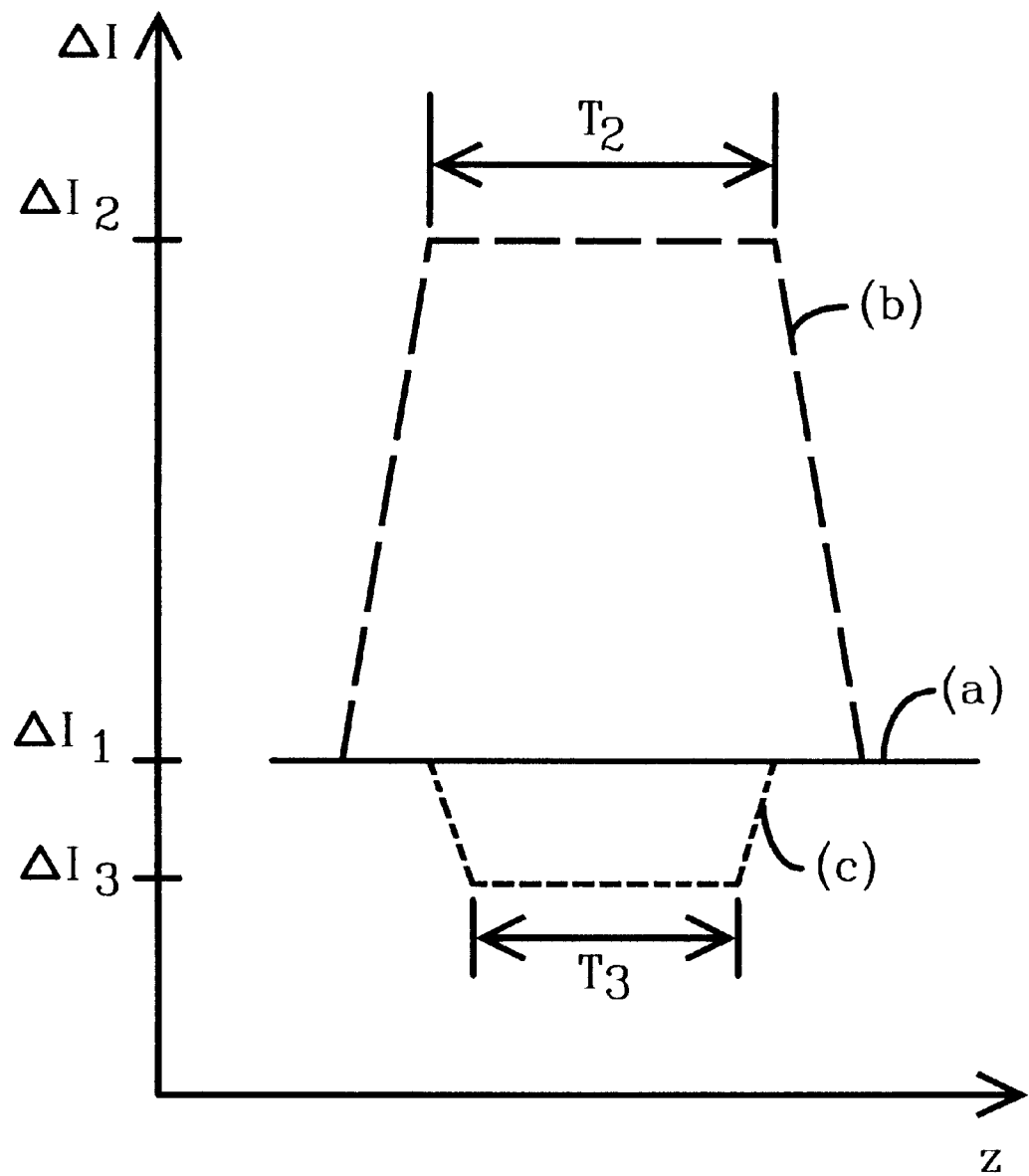
FIG. 2 shows ΔI vs. Z which diagrammatically depicts the response of the tool to different formations which is marked with the legend "Prior Art".

Quoting further from Ser. No. 07/089,697 {Vail (542)}: "FIG. 2 shows the differential current conducted into formation ΔI for different vertical positions z within a steel cased borehole. Z is defined as the position of electrode D in FIG. 1. It should be noted that with a voltage applied to electrode A and with SW1 connected to electrode B that this situation consequently results in a radially symmetric electric field being applied to the formation which is approximately perpendicular to the casing. The electrical field produces outward flowing currents such as ΔI in FIG. 1 which are inversely proportional to the resistivity of the formation. Therefore, one may expect discontinuous changes in the current ΔI at the interface between various resistive zones particularly at oil/water and oil/gas boundaries. For example, curve (a) in FIG. 2 shows the results from a uniform formation with resistivity $\rho_1$. Curve (b) shows departures from curve (a) when a formation of resistivity $\rho_2$ and thickness $T_2$ is intersected where $\rho_2$ is less than $\rho_1$. And curve (c) shows the opposite situation where a formation is intersected with resistivity $\rho_3$ which is greater than $\rho_1$ which has a thickness of $T_3$. It is obvious that under these circumstances, $\Delta I_3$ is less than $\Delta I_1$, which is less than $\Delta I_2$.

Figure 3:
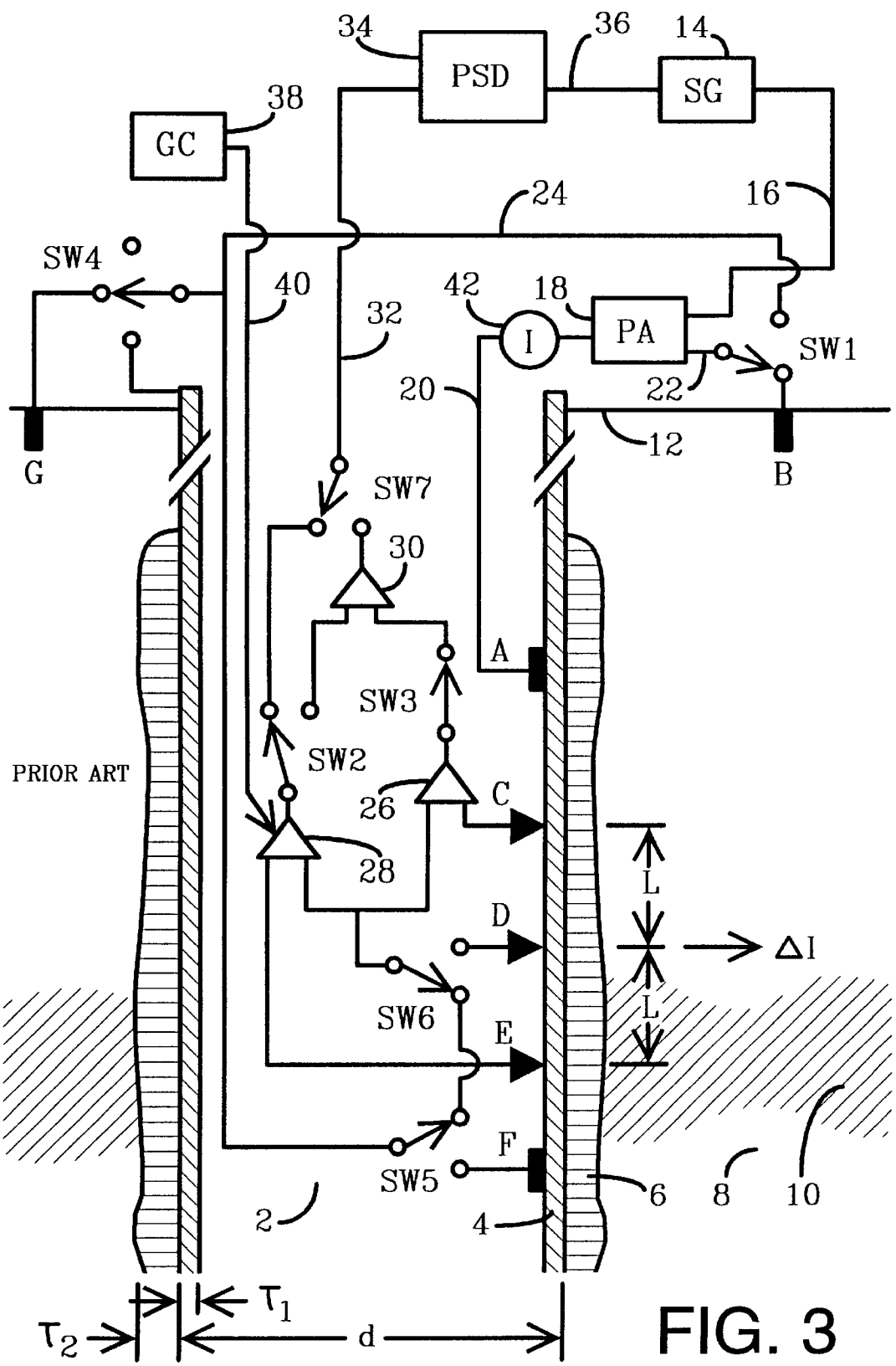
FIG. 3 is a sectional view of a preferred embodiment of the invention which shows how $V_o$ is to be measured that is marked with the legend "Prior Art".

FIG. 3 shows a detailed method to measure the parameter Vo. Electrodes A, B, C, D, E, and F have been defined in FIG. 1. All of the numbered elements 2 through 40 have already been defined in FIG. 1. In FIG. 3, the thickness of the casing is $\tau_1$, the thickness of the cement is $\tau_2$, and d is the diameter of the casing. Switches SW1, SW2, and SW3 have also been defined in FIG. 1. In addition, electrode G is introduced in FIG. 3 which is the voltage measuring reference electrode which is in electrical contact with the surface of the earth. This electrode is used as a reference electrode and conducts little current to avoid measurement errors associated with current flow.

In addition, SW4 is introduced in FIG. 3 which allows the connection of cable 24 to one of the three positions: to an open circuit; to electrode G; or to the top of the borehole casing. And in addition in FIG. 3, switches SW5, SW6, and SW7 have been added which can be operated in the positions shown. (The apparatus in FIG. 3 can be operated in an identical manner as that shown in FIG. 1 provided that switches SW2, SW5, SW6, and SW7 are switched into the opposite states as shown in FIG. 3 and provided that SW4 is placed in the open circuit position.)

With switches SW2, SW5, SW6, and SW7 operated as shown in FIG. 3, then the quantity Vo may be measured. For a given current I conducted to electrode A, then the casing at that point is elevated in potential with respect to the zero potential at a hypothetical point which is an "infinite" distance from the casing. Over the interval of the casing between electrodes C, D, and E in FIG. 3, there exists an average potential over that interval with respect to an infinitely distant reference point. However, the potential measured between only electrode E and electrode G approximates Vo provided the separation of electrodes A, C, D, and E are less than some critical distance such as 10 meters and provided that electrode G is at a distance exceeding another critical distance from the casing such as 10 meters from the borehole casing. The output of amplifier 28 is determined by the voltage difference between electrode E and the other input to the amplifier which is provided by cable 24. With SW1 connected to electrode B, and SW4 connected to electrode G, cable 24 is essentially at the same potential as electrode G and Vo is measured appropriately with the phase sensitive detector 34. In many cases, SW4 may instead be connected to the top of the casing which will work provided electrode A is beyond a critical depth . . . ".

Quoting further from Ser. No. 07/089,697 {Vail (542)}: "For the purposes of precise written descriptions of the invention, electrode A is the upper current conducting electrode which is in electrical contact with the interior of the borehole casing; electrode B is the current conducting electrode which is in electrical contact with the surface of the earth; electrodes C, D, and E are voltage measuring electrodes which are in electrical contact with the interior of the borehole casing; electrode F is the lower current conducting electrode which is in electrical contact with the interior of the borehole casing; and electrode G is the voltage measuring reference electrode which is in electrical contact with the surface of the earth.

Furthermore, $V_o$ is called the local casing potential. An example of an electronics difference means is the combination of amplifiers 26, 28, and 30. The differential current conducted into the formation to be measured is $\Delta I$." The differential voltage is that voltage in FIG. 1 which is the output of amplifier 30 with SW1 connected to electrode B and with all the other switches in the positions shown.

Figure 4:
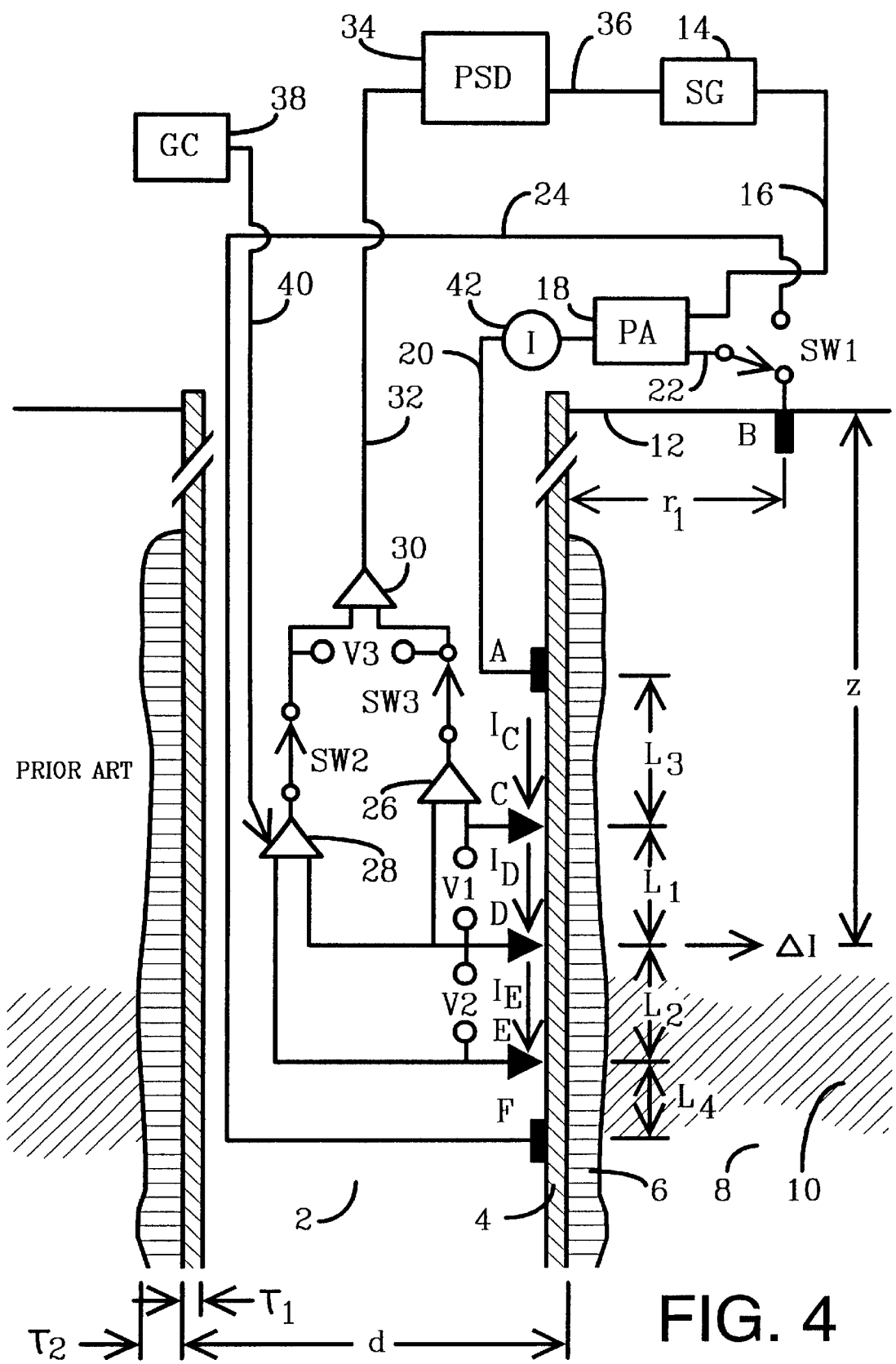
FIG. 4 is a sectional view of an embodiment of the invention which has voltage measurement electrodes which are separated by different distances that is marked with the legend "Prior Art".
Figure 5:
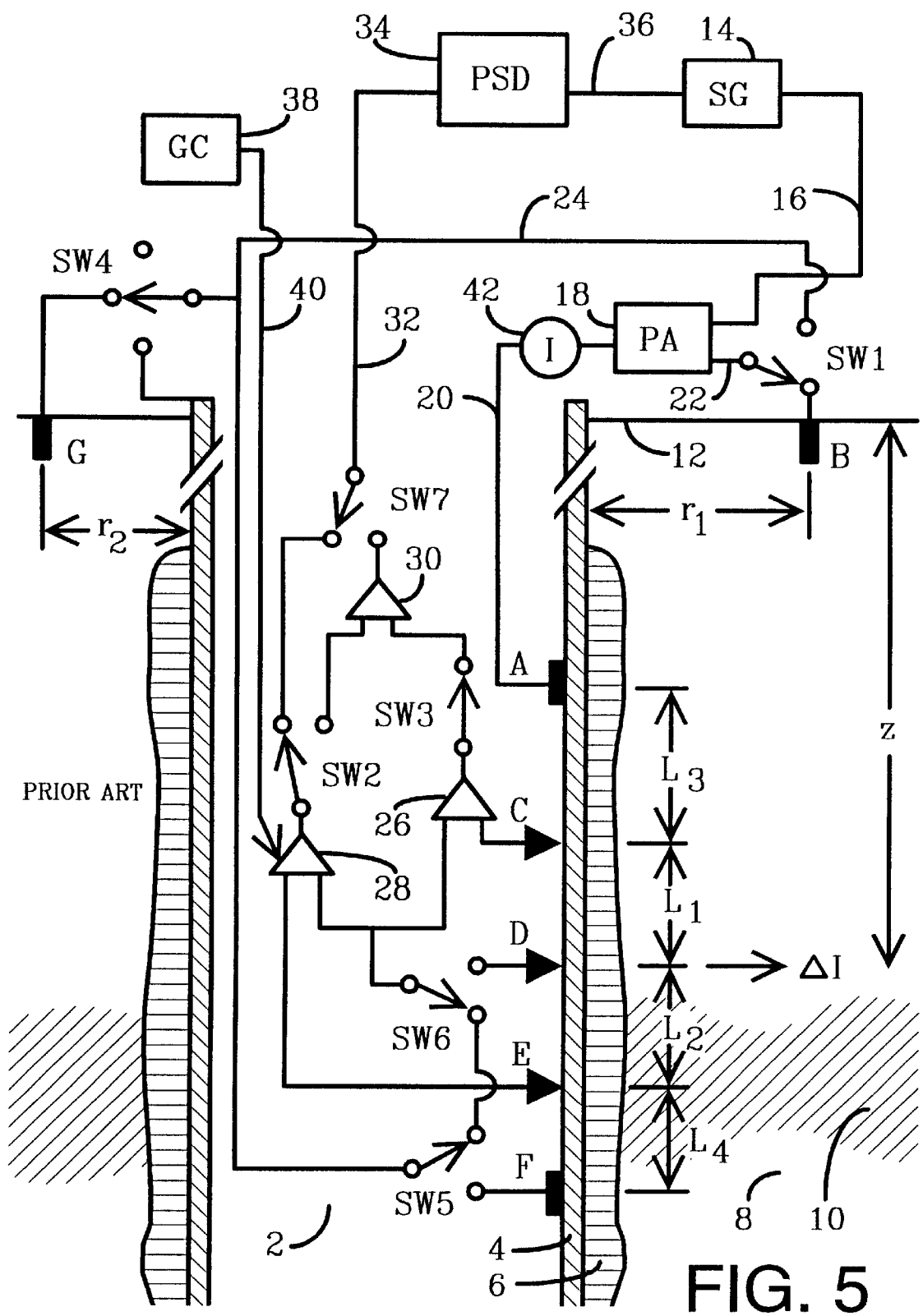
FIG. 5 is a sectional view of an embodiment of the invention which has electrodes which are separated by different distances and which shows explicitly how to measure $V_o$ that is marked with the legend "Prior Art".

Further quoting from Ser. No. 07/089,697 {Vail (542)}: "FIG. 4 is nearly identical to FIG. 1 except the electrodes C and D are separated by length $L_1$, electrodes D and E are separated by $L_2$, electrodes A and C are separated by $L_3$ and electrodes E and F are separated by the distance $L_4$. In addition, $r_1$ is the radial distance of separation of electrode B from the casing. And Z is the depth from the surface of the earth to electrode D. FIG. 5 is nearly identical to FIG. 3 except here too the distances $L_1$, $L_2$, $L_3$, $L_4$, $r_1$, and Z are explicitly shown. In addition, $r_2$ is also defined which is the radial distance from the casing to electrode G. As will be shown explicitly in later analysis, the invention will work well if $L_1$ and $L_2$ are not equal. And for many types of measurements, the distances $L_3$ and $L_4$ are not very important provided that they are not much larger in magnitude than $L_1$ and $L_2$."

Figure 6:
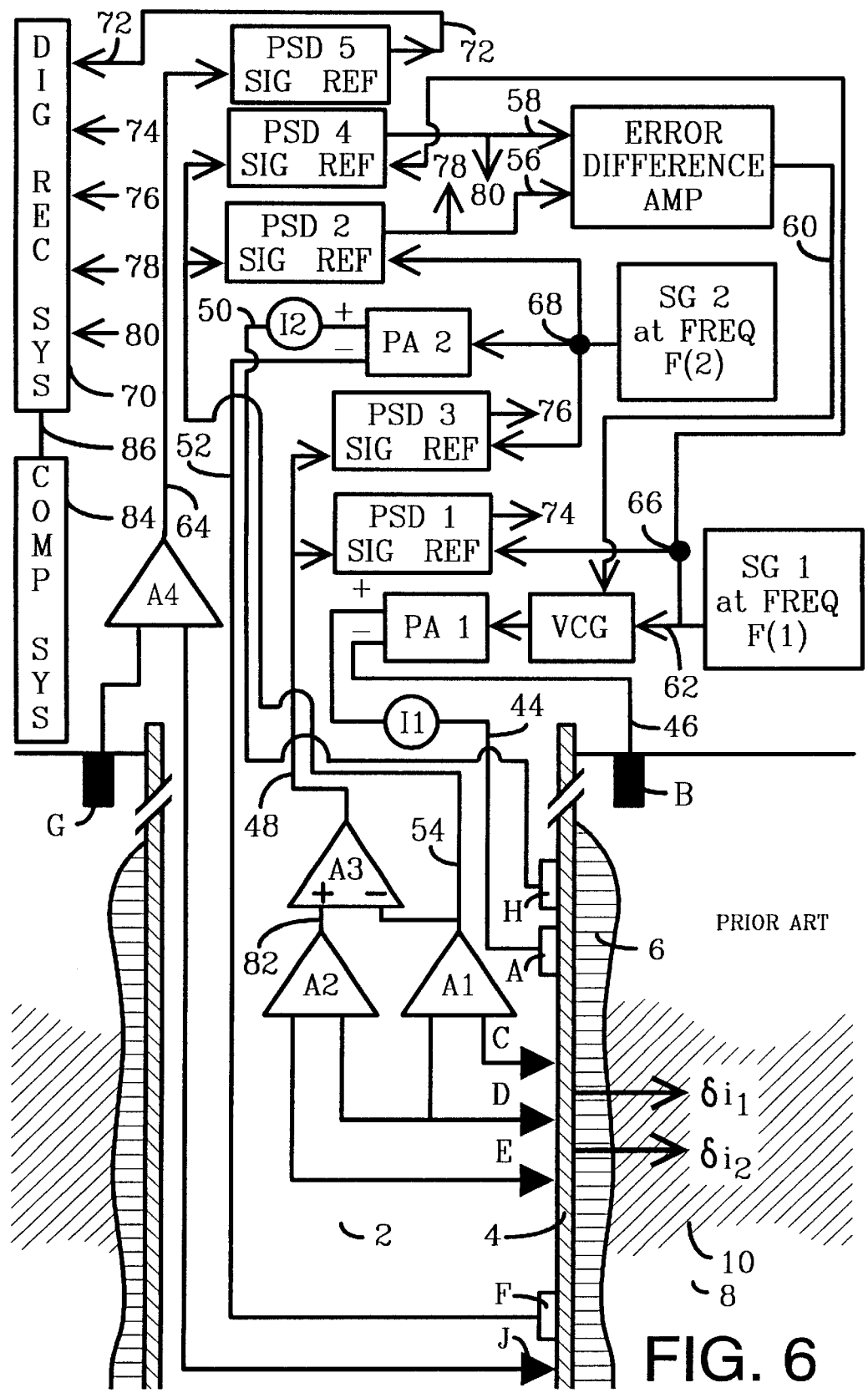
FIG. 6 is a sectional view of an embodiment of the invention which provides multi-frequency operation to compensate for errors of measurement marked with the legend "Prior Art".

FIG. 6 was first described in Ser. No. 07/434,886 {Vail (626)} which states: "For the purpose of logical introduction, the elements in FIG. 6 are first briefly compared to those in FIGS. 1–5. Elements No. 2, 4, 6, 8, and 10 have already been defined. Electrodes A, B, C, D, E, F, G and the distances $L_1$, $L_2$, $L_3$, and $L_4$ have already been described. The quantities $\delta i_1$ and $\delta i_2$ have already been defined in the above text. Amplifiers labeled with legends A1, A2, and A3 are analogous respectively to amplifiers 26, 28, and 30 defined in FIGS. 1, 3, 4, and 5. In addition, the apparatus in FIG. 6 provides for the following:

(a) two signal generators labeled with legends "SG 1 at Freq F(1)" and "SG 2 at Freq F(2)";

(b) two power amplifiers labeled with legends "PA 1" and "PA 2";

(c) a total of 5 phase sensitive detectors defined as "PSD 1", "PSD 2", "PSD 3", "PSD 4", and "PSD 5", which respectively have inputs for measurement labeled as "SIG", which have inputs for reference signals labeled as "REF", which have outputs defined by lines having arrows pointing away from the respective units, and which are capable of rejecting all signal voltages at frequencies which are not equal to that provided by the respective reference signals;

(d) an "Error Difference Amp" so labeled with this legend in FIG. 6;

(e) an instrument which controls gain with voltage, typically called a "voltage controlled gain", which is labeled with legend "VCG";

(f) an additional current conducting electrode labeled with legend "H" (which is a distance $L_5$—not shown—above electrode A);

(g) an additional voltage measuring electrode labeled with legend J (which is a distance $L_6$—not shown—below electrode F);

(h) current measurement devices, or meters, labeled with legends "I1", and "I2";

(i) and differential voltage amplifier labeled with legend "A4" in FIG. 6."

Ser. No. 07/434,886 {Vail (626)} further describes various cables labeled with legends respectively 44, 46, 48, 50, 52, 54, 56, 58, 60, 62, and 64 whose functions are evident from FIG. 6.

Ser. No. 07/434,886 {Vail)626)} further states: "The outputs of PSD 1, 2, 3, and 4 are recorded on a digital recording system 70 labeled with legend "DIG REC SYS". The respective outputs of the phase sensitive detectors are connected to the respective inputs of the digital recording system in FIG. 6 according to the legends labeled with numbers 72, 74, 76, 78, and 80. One such connection is expressly shown in the case of element no. 72."

Ser. No. 07/434,886 {Vail (626)} teaches in great detail that it is necessary to accurately measure directly, or indirectly, the resistance between electrodes C-D (herein defined as "R1") and the resistance between electrodes D-E (herein defined as "R2") in FIGS. 1, 3, 4, 5 and 6 to precisely measure current leakage into formation and formation resistivity from within the cased well. Please refer to Equations 1–33 in Ser. No. 07/434,886 {Vail (626)} for a thorough explanation of this fact. The parent application, Ser. No. 06/927,115 {Vail (989)} and the following Continuation-in-Part application Ser. No. 07/089,697 {Vail (542)} taught that measurement of the resistance of the casing between voltage measurement electrodes that engage the interior of the casing are very important to measure formation resistivity from within the casing.

Using various different experimental techniques that result in current flow along the casing between current conducting electrodes A and F in FIGS. 1, 3, 4, 5, and 6 result in obtaining first compensation information related to a first casing resistance defined between voltage measurement electrodes C and D. Similarly, using various different experimental techniques that result in current flow along the casing between current conducting electrodes A and F in FIGS. 1, 3, 4, 5, and 6 result in obtaining second compensation information related to a second casing resistance between voltage measurement electrodes D and E. FIGS. 1, 3, 4, 5, and 6 all provide additional means to cause current to flow into formation, and the measurements performed while current is flowing into the formation is called the measurement information related to current flow into formation. Such measurement information is used to determine a magnitude relating to formation resistivity. FIGS. 7–12 in the remaining application also provide various means to provide measurement information, and respectively first and second compensation information, along with additional information in several cases.

Figure 7:
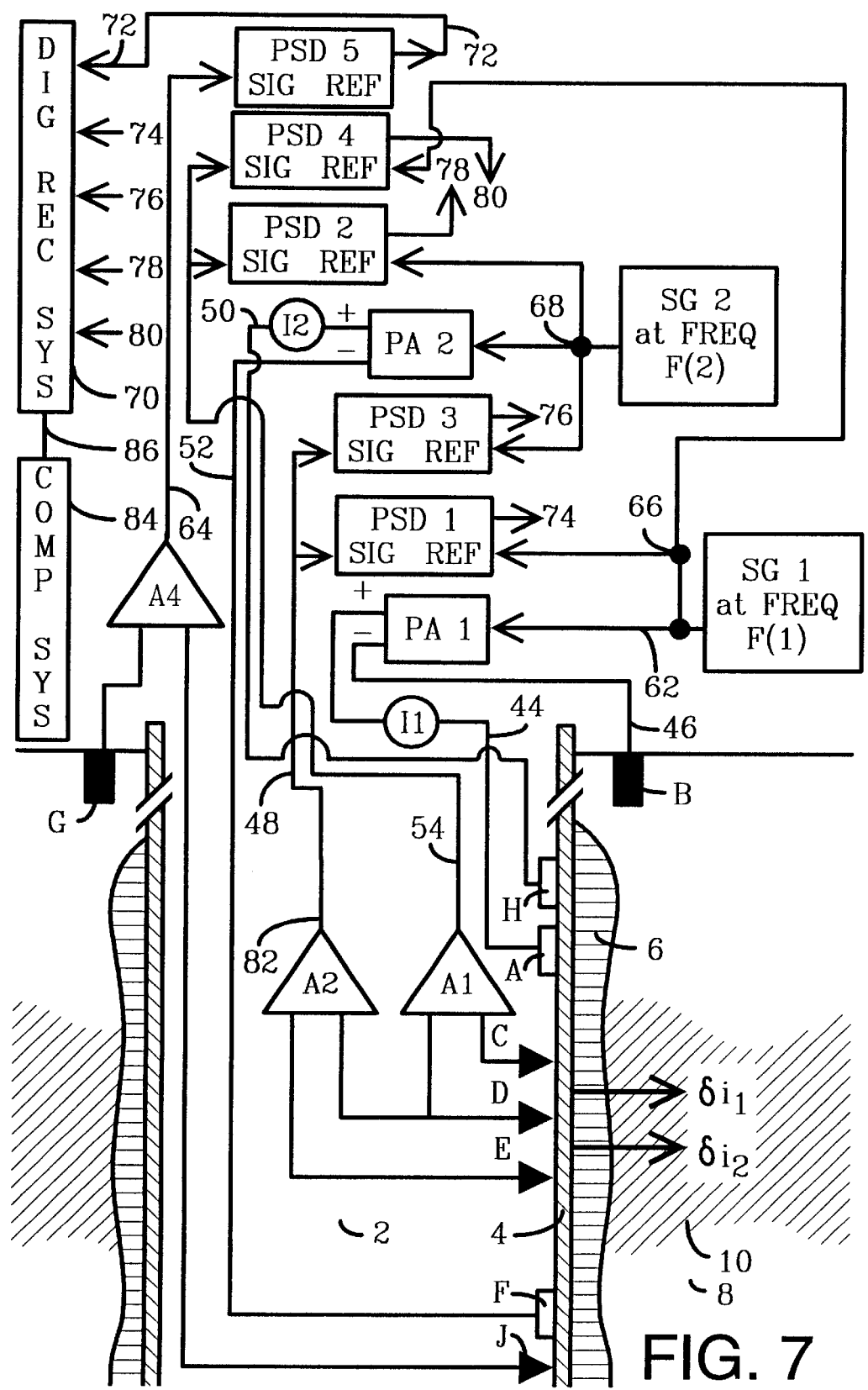
FIG. 7 is a sectional view of an embodiment of the invention that eliminates the use of a certain differential amplifier.

FIG. 7 is closely related to FIG. 6. However, in FIG. 7, amplifier A3 that is shown in FIG. 6, which can be either downhole, or uphole, has been removed. Further, the Error Difference Amp, cable 60, and the VCG have also been removed. In FIG. 7, the output of amplifier A1 at frequency F(1) is measured by PSD 4 and the output of amplifier A1 at frequency F(2) is measured by PSD 2—as was the case in FIG. 6. However, in FIG. 7, the output of amplifier A2 at F(1) is measured by PSD 1 and the output of amplifier A2 at F(2) is measured by PSD 3. In FIG. 7, current at the frequency of F(1) is conducted into formation resulting in measurement information being obtained from PSD 1 and PSD 4. Current at the frequency of F(2) is caused to flow along the casing between electrodes H and F to provide compensation for casing thickness variations and to provide compensation for errors in the placement of the voltage measurement electrodes. First compensation information related to the casing resistance between electrodes C and D is obtained from PSD 2. Second compensation information related to the casing resistance between electrodes D and E is obtained from PSD 3. Analogous algebra exists for the operation of the apparatus in FIG. 7 to Equations 1–33 in Ser. No. 07/434,886 {Vail (626)} that provides compensation for casing resistance differences and for errors of placements of the three spaced apart voltage measurement electrodes C, D, and E.

Figure 8:
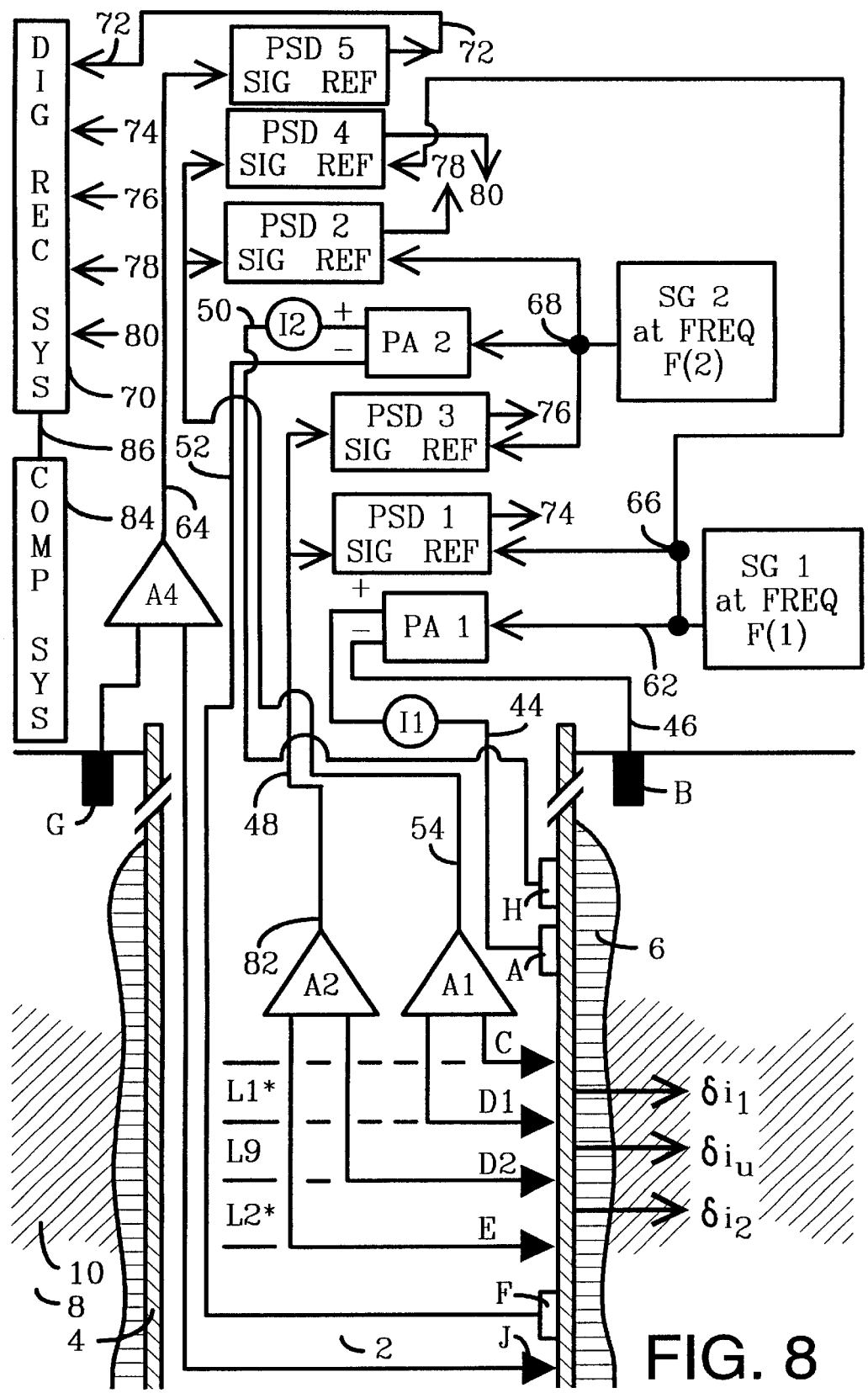
FIG. 8 is a sectional view of an embodiment of the invention that possesses four spaced apart voltage measurement electrodes.

FIG. 8 is similar to FIG. 7 except that electrode D in FIG. 7 has been intentionally divided into two separate electrodes D1 and D2. D1 and D2 do not overlap and are separated by a distance L9. Electrodes C and D1 are separated by distance L1*. Electrodes D2 and E are separated by the distance L2*. If D(1) and D(2) overlap, then the invention has the usual configuration described in FIGS. 1, 3, 4, 5, 6, and 7. Then consider the situation wherein electrodes D(1) and D(2) do not overlap. Suppose they are separated by 1 inch. Then suppose that the separation distance between C to D(1) is 20 inches and suppose that the separation distance between D(2) to E is also 20 inches. Then clearly, the invention will still work, although there will be some error in the current leakage measurement caused by the lack of measurement information from the 1 inch segment. Perhaps the error shall be on the order of 1 inch divided by 20 inches, or on the order of an approximate 5% error. FIG. 8 shows an apparatus having four spaced apart voltage measurement electrodes that compensates for casing thickness variations and for errors in placements of electrodes by providing measurements of the casing resistance R1 between electrodes C and D1 at the frequency of F(2) by PSD 2 and by providing measurements of the casing resistance R2 between electrodes D2 and E at the frequency F(2) by PSD 3.

FIG. 8 may be operated in a particularly simple manner. The signal between electrodes C-D1 can be used to control current flowing along the casing at the frequency F(1) (by using electronics, not shown, of the type used to control currents in FIG. 6). Then the signal between electrodes D2-E can be used to measure information related to current flow along the casing and into the formation at the frequency of F(1). Despite the fact that electrodes C-D1 are used to "control current", nonetheless, the apparatus so described requires at least 3 spaced apart voltage measurement electrodes and is therefore another embodiment of the invention herein.

Figure 9:
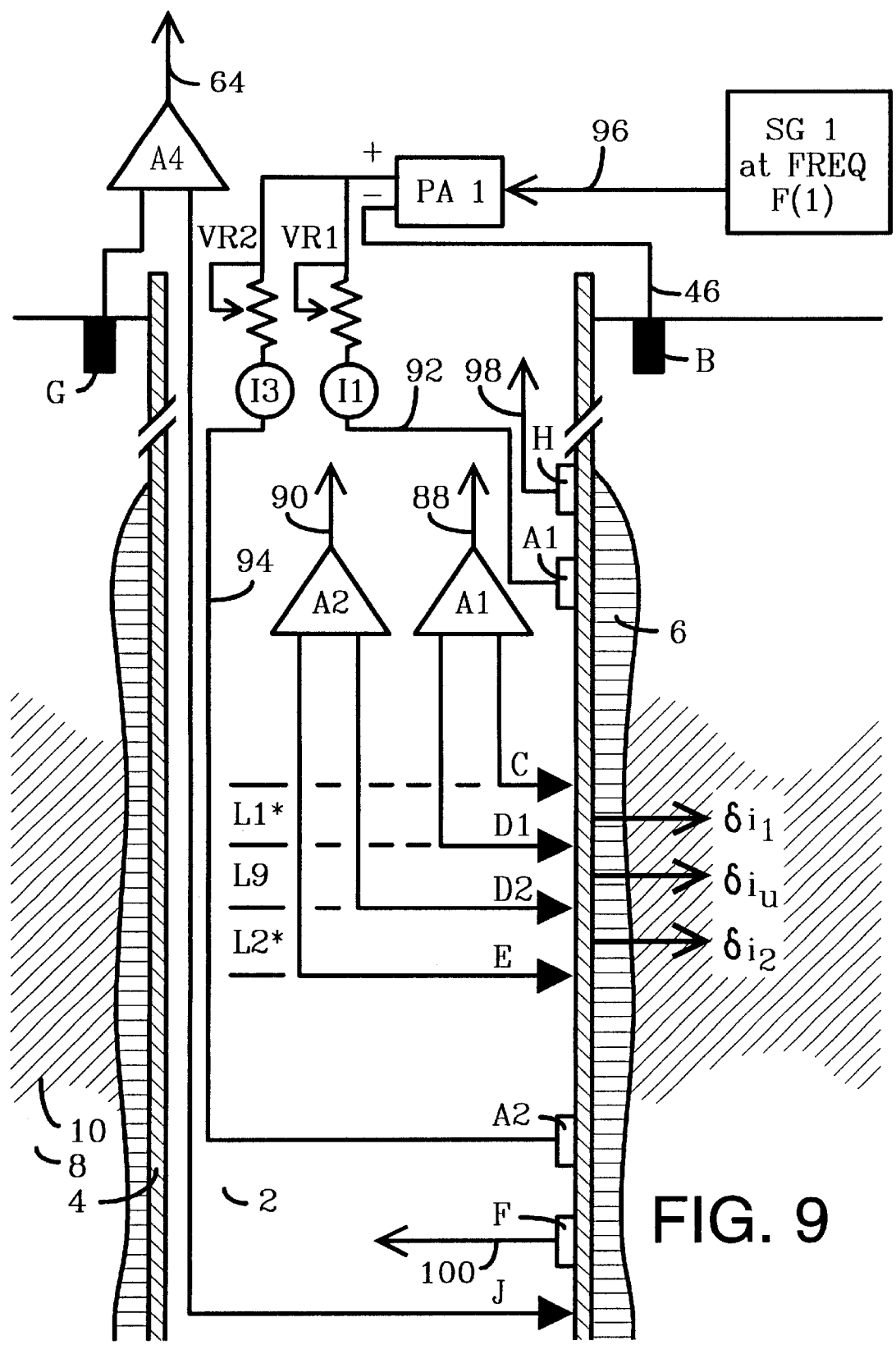
FIG. 9 is a sectional view of an embodiment of the invention that possesses four spaced apart voltage measurement electrodes and extra current introducing electrodes.

FIG. 9 shows certain changes to the apparatus defined in FIG. 8. Changes from FIG. 8 includes cables 88 and 90 that are meant to convey signals to the appropriate phase sensitive detectors shown in FIG. 8 for the purposes of simplicity; extra variable resistor labeled with legend "VR1" placed in series with current meter labeled with legend "I1" connected to cable 92 that provides current at the frequency of F(1) to the upper current conducting electrode here defined as A1; extra variable resistor labeled with legend "VR2" placed in series with another current meter labeled with legend "I3" connected to cable 94 that provides current at the frequency of F(1) to new electrode A2. Electrodes H and F are shown connected to cables 98 and 100 respectively which operate as shown in FIG. 8, but many of the details are omitted in FIG. 9 in the interest of simplicity. In FIG. 9, current at the frequency of F(2) is passed between electrodes H and F as in FIG. 8 which provides first compensation information related to current flow through the casing resistance ("R1") between electrodes C-D1 and second compensation information related to current flow through the casing resistance ("R2") between electrodes D2-E, although many of the details are not shown in FIG. 9 for the purposes of simplicity. The purpose of electrodes A1 and A2 in FIG. 9 are to provide simultaneously upward and downward flowing currents along the casing at the frequency of F(1). Such simultaneously upward and downward flowing currents along the casing are hereinafter defined as "counter-flowing currents". Such counter-flowing currents in the vicinity of the voltage measurement electrodes C, D1, D2, and E minimize the "common mode signal" input to the amplifiers A1 and A2. Therefore, the signal output of amplifiers A1 and A2 in the presence of such counter-flowing currents tends to be more responsive to the current actually flowing into formation and less responsive to the relatively larger currents flowing along the casing. Other apparatus showing methods of introducing counter-flowing currents on the casing include FIGS. 22 and 23 of Ser. No. 07/089,697 {Vail (542)}. The current actually flowing into the formation at the frequency of F(1) generates voltages across amplifiers A1 and A2 responsive to the current flow into formation that results in measurement information at the frequency of F(1) from phase sensitive detectors as shown in FIG. 8. That measurement information is used to determine a magnitude relating to formation resistivity, including information related to the resistivity of the adjacent geological formation.

Figure 10:
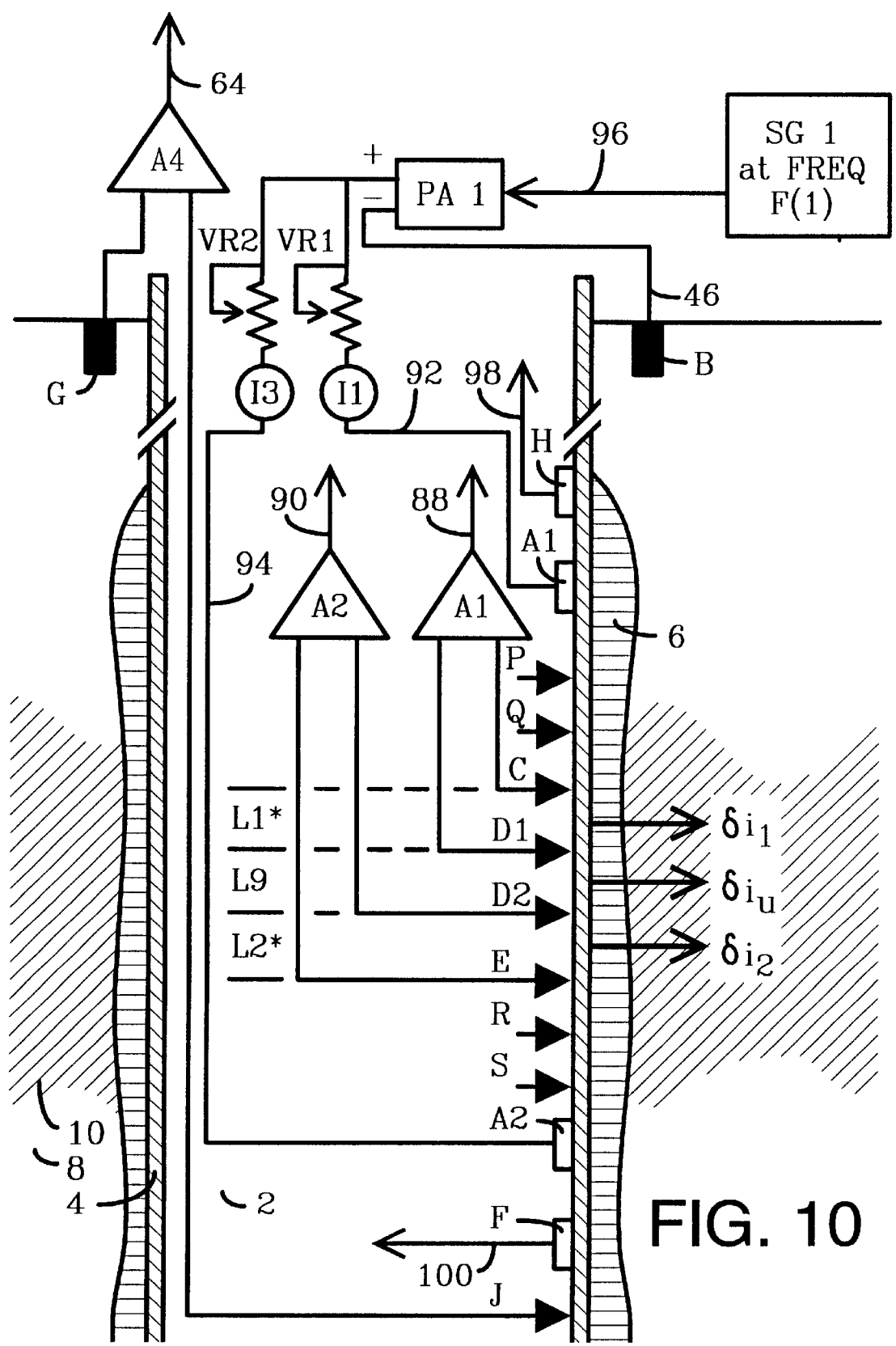
FIG. 10 is a multi-electrode apparatus designed to keep certain currents flowing along the casing constant in amplitude in the vicinity of four spaced apart voltage measurement electrodes used to measure resistivity.

FIG. 10 improves the measurement accuracy of the apparatus defined in FIG. 9. FIG. 10 is similar to FIG. 9 except that in FIG. 10 extra voltage measurements P, Q, R, and S have been added. The purpose of additional voltage measurement electrodes P and Q are to sense the current flowing along the casing at the frequency of F(1) between P and Q. Further electronics, not shown, are used to control the variable resistor VR1 such that the current flowing along the casing remains relatively constant at the frequency of F(1). Please recall that electrodes H and F are used to conduct current along the casing at the frequency of F(2) and therefore, measurements of the potential difference between P and Q can be used to measure the casing resistance between P and Q that is called "R3" which is therefore used as necessary information to keep the current flowing at the frequency F(1) through R3. FIG. 6 has already provided means to maintain equality of currents flowing along the casing, and similar apparatus can be adapted herein to maintain the equality of current flow at the frequency of F(1) between P and Q. Similarly comments can be made regarding new electrodes R and S which can be used to keep the current flowing along the casing at the frequency of F(1) constant through the casing resistance between electrodes R and S, that is "R4" by controlling the variable resistor VR2. If the current flowing through R3 at F(1) is held constant as the device vertically logs the well, then that shall serve to minimize the influence of the lack of information caused by the separation of electrodes D1 and D2. Similarly, if the current flowing through R4 at F(1) is held constant, that too serves to minimize the influence of the lack of information caused by the separation between electrodes D1 and D2. Consequently, extra current control means have been provided to control the current flow along the casing at the F(1) to minimize the influence of the lack of information from portions of the casing having no voltage measurement electrodes present. With suitably added amplifiers, these new electrode pairs can be used to independently monitor the counter-flowing currents at the measurement frequency at the positions shown. In particular, electrode pairs P-Q and R-S can be provided with amplifiers and feedback circuitry that drives the currents to A1 and A2 such that the counter-flowing current at the measurement frequency (for example, 1 Hz) is driven near zero across the voltage measurement electrodes C-D1 and D2-E. Regardless of the details of operation chosen however, the invention disclosed in FIG. 10 provides four spaced electrodes means that provides measurement information related to current flow into formation, and respectively, first and second compensation information related to measurements of R1 and R2 between respectively electrodes C-D, and D-E that are used to determine a magnitude related to formation resistivity. Altogether, FIG. 10 shows a total of 8 each voltage measurement electrodes operated as 4 pairs of voltage measurement electrodes.

Figure 11:
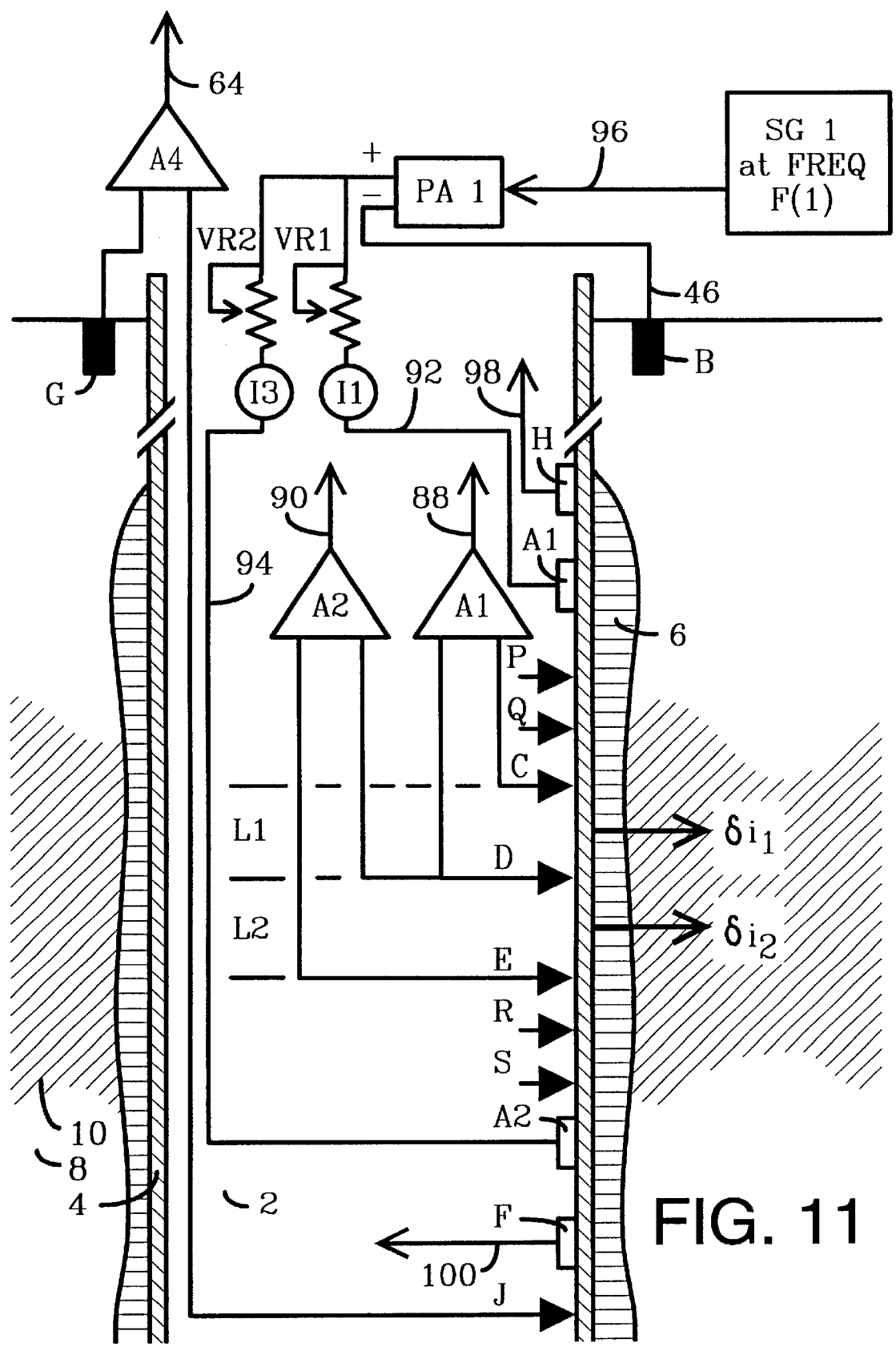
FIG. 11 is a multi-electrode apparatus designed to keep certain currents flowing along the casing constant in amplitude in the vicinity of three spaced apart voltage measurement electrodes used to measure resistivity.

FIG. 11 is similar to FIG. 10 except that electrodes D1 and D2 have been re-combined back into one single electrode D herein. However, the extra potential voltage measurement electrodes P-Q, and R-S remain in FIG. 11 to maintain equality of the magnitude of the counter-flowing currents along the casing at the frequency of F(1). Maintaining the equality of counter-flowing currents along the casing at F(1), and ideally causing the counter-flowing currents to approach the limit of zero net current flowing up or down the casing at the frequency of F(1) will result in improved measurement accuracy. Regardless of the details of operation chosen however, the invention disclosed in FIG. 11 provides a minimum of 3 spaced electrodes means that provides measurement information related to current flow into formation, and respectively, first and second compensation information related to measurements of R1 and R2 between respectively electrodes C-D, and D-E that are used to determine a magnitude related to formation resistivity. Altogether, FIG. 11 shows a total of 7 each voltage measurement electrodes operated as 4 pairs of voltage measurement electrodes.

Figure 12:
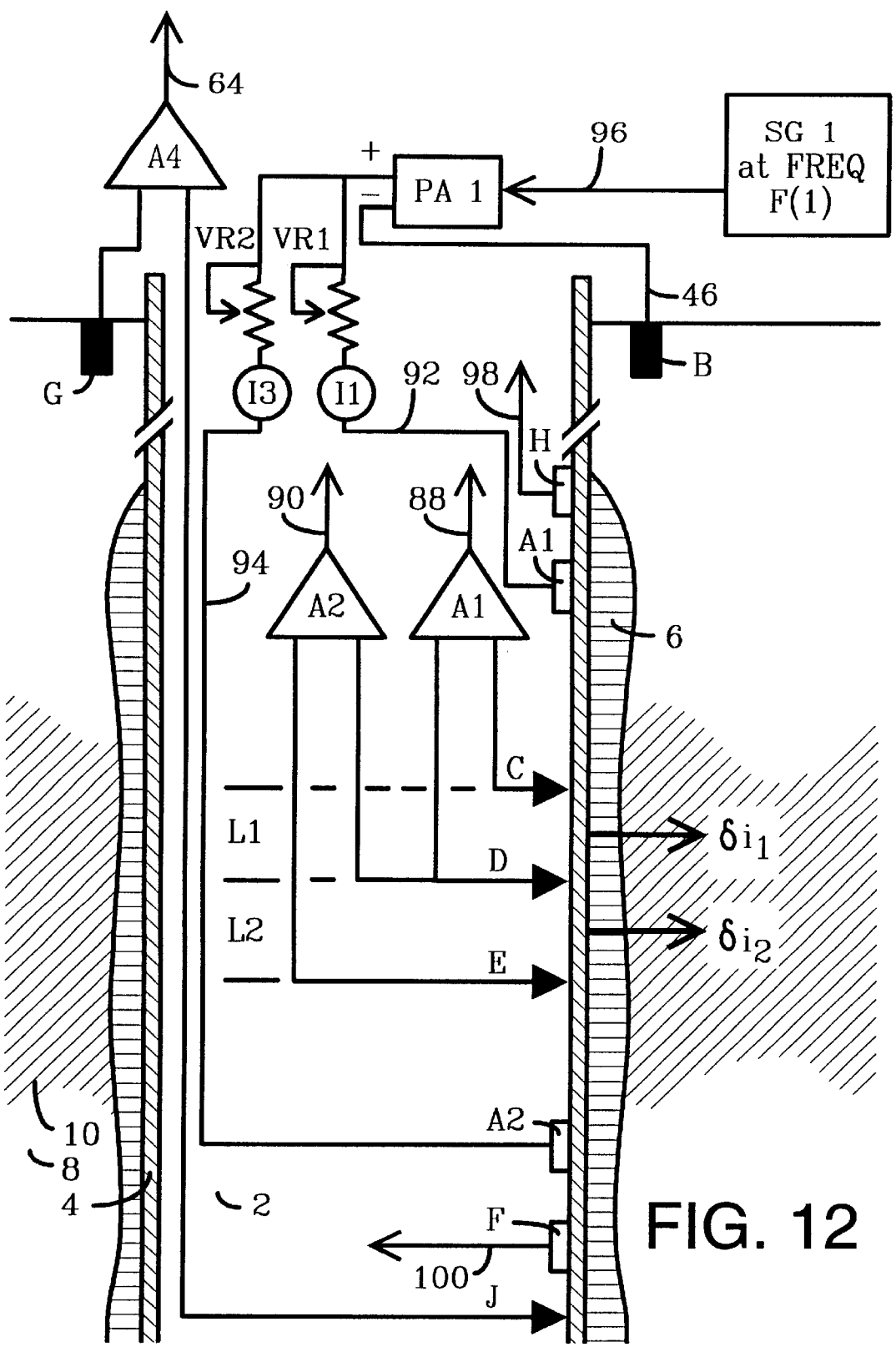
FIG. 12 is an apparatus having three spaced apart voltage measurement electrodes and extra current introducing electrodes.

FIG. 12 is similar to FIG. 11 except that the extra potential voltage measurement electrodes P-Q and R-S have been removed. It should be noted that the apparatus defined in FIG. 12 results in knowledge of the measurement current leaking into formation, knowledge of the resistance R1 between voltage measurement electrodes C-D, and the knowledge of the resistance R2 between voltage measurement electrodes D-E. Therefore, the apparatus in FIG. 12 provides knowledge of the net current at F(1) flowing through resistor R1 between electrodes C-D. Similarly, the apparatus in FIG. 12 provides knowledge of the net current at F(1) flowing through resistor R2 between electrodes D-E. Extra control circuitry, not shown, can be adapted as in FIG. 6 to minimize the net counter-flowing currents flowing by the combined resistors R1 and R2 to improve measurement accuracy. Regardless of the details of operation chosen however, the invention disclosed in FIG. 12 provides a minimum of 3 spaced apart electrode means that provide measurement information related to current flow into formation, and respectively, first and second compensation information related to measurements of R1 and R2 between respectively electrodes C-D, and D-E that are used to determine a magnitude related to formation resistivity.

The apparatus in FIG. 12 may be operated in a particularly simple manner. Information from pair C-D can be used to control the magnitude of the current flowing along the casing at the frequency of F(1), and keep it constant. Then information from pair D-E can be used to infer geophysical parameters from measurements of the current at the frequency of F(1). Despite the fact that the first pair C-D is used primarily herein "to control current", the apparatus so described nonetheless requires 3 spaced apart voltage measurement electrodes which engage the interior of the casing and is therefore simply another embodiment of the invention herein.

FIG. 13 is functionally identical to FIG. 26 from Ser. No. 07/089,697 that is U.S. Pat. No. 4,882,542, showing an apparatus having multiple voltage measurement electrodes engaging the interior of the casing that is marked with the legend "Prior Art". Individual potential voltage measurement electrodes k, l, m, n, o, p, q, r, s, and t electrically engage the casing. In principle, any total number Z of such potential voltage measuring electrodes can be made to electrically engage the interior of the casing. During the calibration step described in Vail (542), current is passed along the casing resulting in the knowledge of the respective casing resistances between each potential voltage measurement electrode. The casing resistance between electrodes k and l is defined herein as R(k,l). The casing resistance between electrodes l and m is defined herein as R(l,m). The casing resistance between m and n is defined herein R(m,n). The casing resistance between n and o is defined herein as R(n,o). By analogy, the casing resistances R(o,p), R(p,q), R(q,r), R(r,s) and R(s,t) are defined herein. In principle, any number of casing resistances can be defined for any number Z of electrodes which electrically engage the interior of the casing. The distance along the casing between electrodes k and l is defined herein as L(k,l). The distance along the casing between electrodes l and m is defined herein as L(l,m). The distance along the casing between electrodes m and n is defined herein as L(m,n). The distance along the casing between electrodes n and o is defined herein as L(n,o). By analogy, the distances of separation of appropriate electrodes are defined herein as L(o,p), L(p,q), L(q,r), L(r,s) and L(s,t). In principle, any number of distances can be defined between any number Z electrodes which electrically engage the interior of the casing. The distance of separation between electrodes can be chosen to be any distance. They may be chosen to be equal or they can be chosen not to be equal, depending upon chosen function. For example, L(k,l) can be chosen to be 3 inches. L(l,m) can be chosen to be 6 inches. L(m,n) can be chosen to be 12 inches. L(n,o) can be chosen to be 20 inches. L(o,p) can be chosen to be 52 inches. L(p,q) can be chosen to be 60 inches. L(q,r) can be chosen to be 120 inches. Further, electrodes s and t can be disconnected. Such an array can measure the potential voltage distribution along the casing or the potential voltage profile along the casing in response to calibration currents primarily flowing along the casing and in response to the measurement currents flowing along the casing and into the formation. The calibration current can be at chosen to be the same frequency as the measurement current as originally described in Vail (989) or can be at a different frequency as described in Vail (626). The above described variable spacing can be used to infer the vertical and radial variations of the geological formation, the vertical distribution of geological beds, and other geological information. Regardless of the details of operation chosen however, the invention disclosed in FIG. 13 provides a minimum of 3 spaced apart voltage measurement electrode means that provide measurement information related to current flow into formation, and respectively, first and second compensation information related to measurements of at least two casing resistances respectively between the three voltage measurement electrodes, wherein said measurement information and the first and second compensation information are used to determine a magnitude related to formation resistivity. FIG. 12 and the text herein further shows that a plurality of spaced apart electrodes along the casing, which may be chosen to be spaced at various different intervals, provide multiple measurements of quantities related to current flow into formation, and provide multiple measurements of the resistances of the casing spanned by the particular number of chosen spaced apart electrodes that may be used to infer geophysical information including the resistivity of the adjacent formation.

It should also be noted that Ser. No. 07/089,697 {Vail (542)} describes many different means to measure voltage profiles on the casing including those shown in FIGS. 25, 26, 27, 28, and 29 therein. Those drawings describe several other apparatus geometries having multiple electrodes.

It may also be worthwhile to note here that several of the figures show different preferred embodiments of the invention. In FIGS. 1, 2, 3, 4, and 5, switch 22 is in one of several positions, so this switch "alters" between one state and another one, and hence such methods of measurement are sometimes referred to as an "alter method of measurement". FIGS. 6, 7 and 8 explicitly shows two frequencies of operation at the same time, and hence, such methods of measurement are sometimes referred to as a "two frequency method of measurement". In FIGS. 6, 7, and 8, F(2) may be any frequency, and F(1) may be any frequency—provided the other above requirements for the measurement are otherwise satisfied. It is also evident from the above description that more than two frequencies may be used, and hence such methods of measurement are sometimes referred to as a "multiple frequency of method of measurement". And lastly, it is possible to perform measurements of resistivity using hybrid methods, wherein certain measurements are performed at one stage of an "alter method of measurement", and yet other measurements are performed using a "two frequency method of measurement" and/or a "multiple frequency method of measurement". There are many variations of the preferred embodiments of the invention.

Therefore, measurements of the current leakage may be performed using an "alter method of measurement", a "two frequency method of measurement" or a "multiple frequency method of measurement".

Therefore, measurements of the potential voltage may be performed using an "alter method of measurement", a "two frequency method of measurement" or a "multiple frequency method of measurement".

Various embodiments of the invention herein provide many different manners to introduce current onto the casing, a portion of which is subsequently conducted through formation. Various embodiments herein provide many different methods to measure voltage levels at a plurality of many points on the casing to provide a potential voltage profile along the casing which may be interpreted to measure the current leaking off the exterior of the casing from within a finite vertical section of the casing. Regardless of the details of operation chosen however, the invention herein disclosed provides a minimum of 3 spaced apart voltage measurement electrode means that provides measurement information related to current flow into the geological formation, and respectively, first and second compensation information related to measurements of at least two separate casing resistances between the three spaced apart voltage measurement electrodes, wherein the measurement information and the first and second compensation information are used to determine a magnitude related to formation resistivity.

FIG. 14 is an exact copy of FIG. 24 from U.S. Pat. No. 4,882,542 {Vail (542)}, that issued on Nov. 21, 1989, that is Ser. No. 07/089,697, that has the filing date of Aug. 26, 1987. Here, the number of the figure has been changed from "FIG. 24" to "FIG. 14". All the numerals through numeral 42 have already been defined herein. The following excerpt is quoted from Ser. No. 07/089,697 {Vail (542)} commencing on page 20, line 3, and ending on page 20, line 61, as follows (except that the phrase "FIG. 24" has been replaced by the phrase "FIG. 14"):

"FIG. 14 shows another embodiment of the invention. The purpose of FIG. 14 is to present various alternatives for the placement of electrode B and to further discuss requirements which electrode B must satisfy for proper operation of various embodiments of the invention. Here, most all of the elements have been defined in FIG. 1 except here SW1C replaces SW1 in FIG. 1. Switch SW1C may be used to connect to alternative grounding positions shown figuratively as B, $B_1$, $B_2$, and $B_3$ in FIG. 14. Electrode B has already been described. $B_1$ is an electrode in electrical contact with the interior of the casing which is located beyond a critical distance, $L_c$, away from electrode A. As long as the length of casing between A and $B_1$, $L_8$, is comparable to or larger than $L_c$, then the electric field is primarily perpendicular to the casing when electrode A is energized, and the invention works in the usual fashion. The critical distance $L_c$ is that length of casing adjacent to a formation where the series resistance to current flow equals the contact resistance of the pipe adjacent to the formation. (For a uniform formation, that distance can be calculated by requiring that at a particular length $L_c$, the series resistance to current flow along the length $L_c$ of the casing which is given by the algebraic expression ($L_c$ r), where r is defined in Eq. 1, is equal to the resistance $R_c$ in Eq. 6 for the particular length $L_c/2$. This equation is then solved for the length $L_c$. This is also the approximate distance where half of the current flows off the casing into the formation which has already been discussed). The requirement on the length of $L_8$ is a matter of convenience only, because for shorter lengths of $L_8$, as long as the placement of electrode $B_1$ is such that it allows the generation of any significant component of the electric field perpendicular to the casing in the vicinity of electrode A, then current is conducted into formation from the casing adjacent to electrode A, and the invention functions properly. In addition, $B_2$ is an electrode in electrical contact with the top of the borehole casing. Here too, as long as the resistance of the length of casing between A and $B_2$ is comparable to or larger than the total resistance to current flow between electrode A and electrode B, then the electric field is primarily perpendicular to the casing when electrode A is energized, and the invention works in the usual fashion. And finally, $B_3$ is another earth ground, and it's position is immaterial provided that the electric field produced on the exterior of the casing is primarily perpendicular to the casing which will allow proper measurement of the resistivity of the geological formation. Although the electric field is primarily perpendicular to the casing at great depths independent of the position of the ground return (B, $B_1$, $B_2$, or $B_3$), there none-the-less should be small detectable differences related to the different current paths. Therefore, different grounding returns could provide a means of measuring the resistivity of different selected portions of the formation such as the resistivity of different quadrants. Such measurements are only a minor modification of the invention."

As stated earlier, all the elements through element 42 in FIG. 14 have already been defined. The remaining legends in FIG. 14 are listed as follows: $L_7$, that is the distance below the surface to the earth to electrode $B_1$; $L_8$, that is the distance between electrode $B_1$ and electrode A; $r_1$, that is the radial distance from the cased well to electrode B; and $r_3$ that is the radial position from the well to electrode $B_3$.

It should be noted that above described calculation for $L_c$ is explicitly presented in Equation 1 on page 9 of U.S. Pat. No. 5,187,440 {Vail (440)} that issued on Feb. 16, 1993, that is Ser. No. 07/749,136, and that has the Filing Date of Aug. 23, 1991, an entire copy of which is included herein by reference.

It is useful to further discuss certain the above quote related to FIG. 14. One sentence reads: "The requirement on the length of $L_8$ is a matter of convenience only, because for shorter lengths of $L_8$, as long as the placement of electrode $B_1$ is such that it allows the generation of any significant component of the electric field perpendicular to the casing in the vicinity of electrode A, then current is conducted into formation from the casing adjacent to electrode A, and the invention functions properly." The critical operational term here is ". . . generation of any significant component of the electric field . . . ".

Another sentence in that long quote related to FIG. 14 reads as follows: "Although the electric field is primarily perpendicular to the casing at great depths independent of the position of the ground return (B, $B_1$, $B_2$, or $B_3$), there none-the-less should be small detectable differences related to the different current paths. Therefore, different grounding returns could provide a means of measuring the resistivity of different selected portions of the formation such as the resistivity of different quadrants. Such measurements are only a minor modification of the invention."

One ". . . minor modification of the invention . . . " quoted above, relates to the above observation that many different positions electrode $B_1$ result in the ". . . the generation of any significant component of the electric field perpendicular to the casing in the vicinity of electrode A . . . ". Further, the ". . . different grounding returns could provide a means of measuring the resistivity of different selected portions of the formation . . . " From this description, it is evident that another preferred embodiment of the invention provides a means of adjusting the magnitude of the electric field perpendicular to the casing applied to any one geological formation at chosen depth z in FIG. 14 by performing measurements with electrode $B_1$ placed at a first distance $L_8(a)$ above electrode A; and then by performing measurements with electrode $B_1$ placed a second distance $L_8(b)$ above electrode A; and then by performing measurements perhaps another time by performing measurements at a third distance $L_8(c)$ above electrode A. In principle, any number of such measurements could be made.

Furthermore, there is no particular necessary reason in a deep well, with sufficient casing below electrode F, that electrode $B_1$ must be located above electrode A. In fact, with a sufficiently deep well, electrode $B_1$ may be located at any chosen distance below electrode F. In this preferred embodiment, electrode $B_1(L_8)$ may be placed at any distance $L_8$ above electrode A. Here, the position of electrode $B_1$ is a function of $L_8$. Similarly, any such electrode that is located below electrode F would be separated by a distance $L_9$ below electrode F. This electrode will be defined herein to be $B^*_1(L_9)$, where the quantity $B^*_1$ indicates that electrode is located below electrode F in FIG. 14, and is at a distance $L_9$ below electrode F in FIG. 14. However, these legends have not been added to FIG. 14 for the sake of simplicity. Further, the current return electrode $B_1$ above electrode A, and any current return electrode $B^*_1$ located below electrode F in FIG. 14 may be energized simultaneously using apparatus and methods already described above. This in turn provides ". . . means of measuring the resistivity of different selected portions of the formation . . . ". In particular, if the strength of the electric field perpendicular to the casing is adjusted from a first value of the electric field to a second value of the electric field, wherein said second value is greater than the first value, then it is evident that the "radius of investigation" of the formation has been increased. In general, for any particular value of the electric field perpendicular to the casing, there is an appropriate "radius of investigation" for that magnitude of electric field. Performing measurements for various different positions of one, or more current return electrodes, provides a method for measuring the resistivity of the geological formation for different radii of investigation. Therefore, adjusting the various different current return electrodes in the casing provides methods of operation to vary the "radius of investigation", a term defined herein.

The preferred embodiments described above in relation to FIG. 14 provides a means of adjusting the magnitude of the electric field perpendicular to the casing applied to any one geological formation at any depth z in FIG. 14 by performing measurements with different placements of one or more of the current return electrodes. For any such magnitude of applied electric field, then plots similar to those shown in FIG. 2 will be obtained. However, for larger applied fields, the maximum value of $\Delta I$ will be correspondingly larger. Put another way, for a first value of the applied electric field, then a first value of $\Delta I$(first) will be observed. For a larger second value of the applied electric field, then a second value of $\Delta I$(second) will be observed. In the example cited, $\Delta I$(second) will be larger than $\Delta I$(first). Such procedures amount to adjusting the radius of investigation, or the "50% radius of investigation", a term used in the above defined literature.

In Vail (440), FIG. 6 therein shows yet another grounding position, or one more position for another current return electrode that is labeled with the legend $B_4$ therein. The point is that the inventor has provided many possible positions for one or more current return electrodes generically identified by the symbol "B" in many of the figures related to the Vail Patents in this field. For many preferred embodiments, the term "grounding position", "current return electrode", "ground return electrode", "ground return electrode in the cased well", "current return electrode to generate an electric field in the formation exterior to the casing", and similar variations, may all be used equivalently for the purposes herein.

In addition, FIG. 48 in U.S. Pat. No. 4,882,542 Vail (542) shows at least two apparatus disposed within a drill pipe, each having their own current introducing electrodes.

Yet further, FIGS. 6–12 herein each have multiple sets of current introducing electrodes disposed within the wellbore.

Therefore, the invention has described many different preferred embodiments of apparatus and methods of operation that provide for two or more current conducting electrodes in electrical contact with the interior of the casing to measure formation resistivity. The invention has further described many different preferred embodiments of the apparatus and methods of operation that provide for at least two current conducting electrodes in electrical contact with the interior of the casing and one in contact with the top of the casing to measure formation resistivity.

Accordingly, the invention has provide apparatus and methods of operation to determine the resistivity of a formation adjacent to a borehole having casing with an apparatus having all the current conducting electrodes within the cased well. FIG. 14 shows such an apparatus when element 22 is connected through SW1C to electrode $B_1$.

Therefore, and with reference to FIG. 14 and other related figures herein, one embodiment of the invention is an apparatus to provide information useful to determine the resistivity of a geological formation from within a cased well that has a first electrode that electrically engages a first particular section of casing at a specific depth within the well for receiving first signals having voltage related information; a second electrode that electrically engages the first particular section of casing for receiving second signals having voltage related information located a first distance above said first electrode wherein the magnitude of the resistance of the portion of casing between said first and second electrodes is the first resistance; and a third electrode that electrically engages the first particular section of casing for receiving third signals having voltage related information located a second distance below said first electrode wherein the magnitude of the resistance of the portion of casing between said first and third electrodes is the second resistance. This embodiment also has a fourth electrode that electrically engages the casing at a point located a third distance above said second electrode and a fifth electrode that electrically engages the casing at a point located a fourth distance above said fourth electrode. This embodiment also provides means to conduct a first current from said fourth electrode to said fifth electrode. Further, said fourth distance is chosen such that at least a portion of said first current flows into the formation of interest. FIG. 14 shows an apparatus having means to measure said first resistance and said second resistance. FIG. 14 also shows means for processing said first, second and third signals from said first, second, and third electrode means thereby providing information useful to determine the resistivity of the formation of interest.

With reference to FIG. 14 and to other related figures and disclosure, another embodiment provides information useful to determine the resistivity of a geological formation from within a cased well by providing an apparatus having a first electrode that electrically engages a first particular section of casing for receiving first voltage related signals at a specific depth within the well; having a second electrode that electrically engages the first particular section of casing for receiving second voltage related signals located a first distance above said first electrode wherein the magnitude of the resistance of the portion of casing between said first and second electrodes is the first resistance; and a third electrode that electrically engages the first particular section of casing for receiving third voltage related signals located a second distance below said first electrode wherein the magnitude of the resistance of the portion of casing between said first and third electrodes is the second resistance. The apparatus also has a fourth electrode that electrically engages the casing at a point located a third distance above said second electrode and a a fifth electrode that electrically engages the casing at a point located a fourth distance above said fourth electrode. The apparatus has means to conduct a first current between said fourth and fifth electrodes, and the fourth distance is chosen such that at least a portion of said first current flows into the formation of interest. The apparatus has means to measure said first resistance and said second resistance. Methods are set forth that include obtaining said first, second, and third voltage related signals while conducting said first current between said fourth and fifth electrodes; determining the magnitudes of said first resistance and said second resistance; and processing the voltage related signals from each of said first, second, and third electrodes to provide information useful to determine the resistivity of the geological formation of interest.

With reference to FIG. 14 and related figures, and with further reference to the above disclosure, another embodiment has described a method for providing information useful to determine the resistivity of a geological formation surrounded by borehole casing comprising the steps of causing a first current to flow in a first direction along a predetermined portion of the casing and measuring a plurality of first voltages across said portion of the casing; causing a second current to flow in a first direction along said portion of the casing and measuring a plurality of second voltages across said portion of the casing; and using the first and second voltage measurements to provide information useful to determine the resistivity of a said geological formation. With reference to FIG. 14, the term "measuring a plurality of first voltages" means measuring the voltages from electrodes C, D. and E with SW1C connected to electrode B1, and the term "measuring a plurality of second voltages" means measuring the voltages from electrodes C, D, and E with SW1C connected to electrode F. Here, the "first direction" is either up, or down, which may be selected by the settings on the signal generator and the power amplifier.

With further reference to FIG. 14 and other related figures, and with further reference to the above disclosure, another embodiment of the invention describes an apparatus for providing information useful to determine the resistivity of a geological formation surrounded by borehole casing that has a first means to generate and cause a first current to flow in a first direction along a predetermined portion of the casing, a second means to measure a plurality of first voltages across said portion of the casing, a third means to generate and cause a second current to flow in a first direction along said portion of the casing, and a fourth means to measure a plurality of second voltages across said portion of the casing. This apparatus also has processing means using the first and second voltage measurements to provide information useful to determine the resistivity of a said geological formation. With reference to FIG. 14, the term "measuring a plurality of first voltages" means measuring the voltages from electrodes C, D. and E with SW1C connected to electrode B1, and the term "measuring a plurality of second voltages" means measuring the voltages from electrodes C, D, and E with SW1C connected to electrode F. Here, the "first direction" is either up, or down, which may be selected by the settings on the signal generator and the power amplifier.

Many references have been defined herein. In many instances, those references have been actually included in the specification by using the phrase ". . . , an entire copy of which is included herein by reference." Similar variations of this phrase have been used elsewhere in the specification. To be precise, the phrase "included herein by reference" is also equivalent to the phrase "incorporated herein by reference".

While the above description contains many specificities, these should not be construed as limitations on the scope of the invention, but rather as exemplification of preferred embodiments thereto. As has been briefly described, there are many possible variations. Accordingly, the scope of the invention should be determined not only by the embodiments illustrated, but by the appended claims and their legal equivalents.

What is claimed is:

1. An apparatus to provide information useful to determine the resistivity of a geological formation from within a cased well, comprising:

a first electrode that electrically engages a first particular section of casing at a specific depth within the well for receiving first signals having voltage related information;

a second electrode that electrically engages the first particular section of casing for receiving second signals having voltage related information located a first distance above said first electrode wherein the magnitude of the resistance of the portion of casing between said first and second electrodes is the first resistance;

a third electrode that electrically engages the first particular section of casing for receiving third signals having voltage related information located a second distance below said first electrode wherein the magnitude of the resistance of the portion of casing between said first and third electrodes is the second resistance;

a fourth electrode that electrically engages the casing at a point located a third distance above said second electrode;

a fifth electrode that electrically engages the casing at a point located a fourth distance above said fourth electrode;

means to conduct a first current from said fourth electrode to said fifth electrode, whereby said fourth distance is chosen such that at least a portion of said first current flows into the formation of interest;

means to measure said first resistance and said second resistance;

means for processing said first, second and third signals from said first, second, and third electrode means thereby providing information useful to determine the resistivity of the formation of interest, said means for processing taking into account a magnitude relating to the values of said first resistance and said second resistance so that inaccuracy associated with the determination of the resistivity is reduced.

2. A method to provide information useful to determine the resistivity of a geological formation from within a cased well, comprising:

providing an apparatus having a first electrode that electrically engages a first particular section of casing for receiving first voltage related signals at a specific depth within the well;

said apparatus having a second electrode that electrically engages the first particular section of casing for receiving second voltage related signals located a first distance above said first electrode wherein the magnitude of the resistance of the portion of casing between said first and second electrodes is the first resistance;

said apparatus having a third electrode that electrically engages the first particular section of casing for receiving third voltage related signals located a second distance below said first electrode wherein the magnitude of the resistance of the portion of casing between said first and third electrodes is the second resistance;

said apparatus having a fourth electrode that electrically engages the casing at a point located a third distance above said second electrode;

said apparatus having a fifth electrode that electrically engages the casing at a point located a fourth distance above said fourth electrode;

said apparatus having means to conduct a first current between said fourth and fifth electrodes, whereby said fourth distance is chosen such that at least a portion of said first current flows into the formation of interest; and said apparatus having means to measure said first resistance and said second resistance;

obtaining said first, second, and third voltage related signals while conducting said first current between said fourth and fifth electrodes;

determining the magnitudes of said first resistance and said second resistance; and processing the voltage related signals from each of said first, second, and third electrodes to provide information useful to determine the resistivity of the geological formation of interest, said processing taking into account the determined magnitudes of said first resistance and said second resistance to reduce the inaccuracy associated with the determination of the resistivity of the geological formation of interest.

3. A method for providing information useful to determine a resistivity of a geological formation surrounded by borehole casing having a top comprising the steps of:

(a) providing a plurality of current conducting electrodes including a first current electrode and a second current conducting electrode, said plurality of current conducting electrodes being all of said current conducting electrodes used in determining the resistivity of the geological formation, said first current conducting electrode being located closer to the borehole casing top than any other of said plurality of current conducting electrodes and said first current conducting electrode being located closer to said second current conducting electrode than to the borehole casing top;

(b) contacting all of said plurality of current conducting electrodes with said borehole casing;

(c) causing a first current to flow in a first direction along a portion of said borehole casing and measuring a plurality of first voltages across said portion of said borehole casing;

(d) causing a second current to flow in a first direction along said portion of said borehole casing and measuring a plurality of second voltages across said portion of said borehole casing; and (e) using said first and second voltage measurements to provide information useful to determine the resistivity of the geological formation.

4. An apparatus for providing information useful to determine the resistivity of a geological formation surrounded by borehole casing having a top comprising the following:

(a) a plurality of current conducting electrodes including at least a first current conducting electrode and a second current conducting electrode, said plurality of current conducting electrodes being all of said current conducting electrodes used in determining the resistivity of the geological formation, each of said plurality of current conducting electrodes is in contact with the borehole casing, said first current conducting electrode being located closer to the borehole casing top than each of other of said plurality of current conducting electrodes and said first current conducting electrode being located closer to said second current conducting electrode than to the borehole casing top;

(b) first means to generate and cause a first current to flow in a first direction along a portion of the borehole casing and second means to measure a plurality of first voltages across said portion of the borehole casing;

(c) third means to generate and cause a second current to flow in a first direction along said portion of the borehole casing and fourth means to measure a plurality of second voltages across said portion of the borehole casing; and (d) processing means using the first and second voltage measurements to provide information useful to determine the resistivity of the geological formation.

5. A method for providing information useful to determine a resistivity of a geological formation surrounded by borehole casing having a top comprising the steps of:

(a) providing a plurality of current conducting electrodes including a first current conducting electrode and a second current conducting electrode, said plurality of current conducting electrodes being all of said current conducting electrodes used in determining the resistivity of the geological formation;

(b) contacting all of said plurality of current conducting electrodes with said borehole casing;

(c) causing a first current to flow in a first direction along a portion of said borehole casing and measuring a plurality of first voltages across said portion of said borehole casing;

(d) causing a second current to flow in a first direction along said portion of said borehole casing and measuring a plurality of second voltages across said portion of the borehole casing;

(e) using said first and second voltage measurements to provide information useful to determine the resistivity of the geological formation; and (f) measuring a plurality of third voltages across said portion of said borehole casing using a plurality of voltage electrodes.

6. A method, as claimed in claim 5, wherein:

said plurality of voltage electrodes being all of said voltage electrodes used in determining the resistivity of the geological formation and each of said plurality of voltage electrodes being in contact with the borehole casing.

7. A method, as claimed in claim 5, wherein:

at least one of said plurality of voltage electrodes is used in measuring at least one of said plurality of first voltages and said plurality of second voltages.

8. A method for providing information useful to determine a resistivity of a geological formation surrounded by borehole casing having a top comprising the steps of:

(a) providing a plurality of current conducting electrodes including a first current conducting electrode and a second current conducting electrode, said plurality of current conducting electrodes being all of said current conducting electrodes used in determining the resistivity of the geological formation;

(b) contacting all of said plurality of current conducting electrodes with said borehole casing;

(c) causing a first current to flow in a first direction along a portion of said borehole casing and measuring a plurality of first voltages across said portion of said borehole casing;

(d) causing a second current to flow in a first direction along said portion of said borehole casing and measuring a plurality of second voltages across said portion of the borehole casing; and (e) using said first and second voltage measurements to provide information useful to determine the resistivity of the geological formation;

wherein at least one of said steps of measuring said plurality of first voltages and measuring said plurality of second voltages includes adjusting to provide a null related to at least one of said plurality of first voltages and said plurality of second voltages.

9. An apparatus for providing information useful to determine the resistivity of a geological formation surrounded by borehole casing having a top comprising the following:

(a) a plurality of current conducting electrodes including at least a first current conducting electrode and a second current conducting electrode, said plurality of current conducting electrodes being all of said current conducting electrodes used in determining the resistivity of the geological formation, each of said plurality of current conducting electrodes being in contact with the borehole casing;

(b) first means to generate and cause a first current to flow in a first direction along a portion of the borehole casing and second means to measure a plurality of first voltages across said portion of the borehole casing;

(c) third means to generate and cause a second current to flow in a first direction along said portion of the borehole casing and fourth means to measure a plurality of second voltages across said portion of the borehole casing; and (d) processing means using the first and second voltage measurements to provide information useful to determine the resistivity of the geological formation;

wherein a plurality of third voltages are measured using a plurality of voltage electrodes.

10. An apparatus, as claimed in claim 9, wherein:

said plurality of voltage electrodes are all of said voltage electrodes used in determining the resistivity of the geological formation and each of said plurality of voltage electrodes is in contact with the borehole casing.

11. An apparatus, as claimed in claim 9, wherein:

at least one of said second means and said fourth means includes at least one of said plurality of voltage electrodes.

12. A method for providing information useful to determine resistivity of a geological formation surrounded by borehole casing comprising the steps of:

(a) providing a plurality of current conducting electrodes including a first current conducting electrode and a second current conducting electrode;

(b) providing circuitry including at least one amplifier for measuring voltage;

(c) locating said plurality of current conducting electrodes and said circuitry within said borehole casing and below said borehole casing top;

(d) causing a first current to flow in a first direction along at least a first portion of said borehole casing and measuring at least a first voltage across at least said first portion of said borehole casing using said circuitry, with said circuitry being located closer to said first portion of said borehole casing than to said borehole casing top;

(e) causing a second current to flow in a second direction, opposite said first direction, along at least a second portion of said borehole casing and measuring at least a second voltage across at least said second portion of said borehole casing using said circuitry with said circuitry being located more adjacent to said second portion of said borehole casing than to said borehole casing top; and (f) using at least said first and second voltages to provide information useful to determine the resistivity of the geological formation.

13. A method, as claimed in claim 12, wherein:
said providing step includes contacting said plurality of current electrodes with the borehole casing.

14. A method, as claimed in claim 12, wherein:
said steps of causing said first current to flow and causing said second current to flow are conducted at the same time.

15. A method, as claimed in claim 12, wherein:
said first voltage is measured using at least a first voltage electrode located within the borehole casing and said second voltage is measured using at least a second voltage electrode located within the borehole casing.

16. A method, as claimed in claim 12, wherein:
said second portion of the borehole casing corresponds to said first portion of the borehole casing.

17. An apparatus for providing information useful to determine the resistivity of a geological formation adjacent to a borehole casing having a top comprising the following:
(a) a plurality of current conducting electrodes including at least a first current conducting electrode and a second current conducting electrode;
(b) at least first circuitry that generates a first current that flows in a first direction along at least a first portion of the borehole casing and that generates a second current that flows in a second direction, opposite said first direction, along at least a second portion of the borehole casing;
(c) at least second circuitry that measures at least a first voltage and a second voltage across at least said first portion of the borehole casing and across at least said second portion of the borehole casing, respectively, said second circuitry including at least a first amplifier being located within the borehole casing and said second circuitry being located closer to each of said first and second portions of the borehole casing than to the borehole casing top; and
(d) a processor to provide information useful to determine the resistivity of the geological formation using said first and second voltages.

18. An apparatus, as claimed in claim 17, wherein:
said first and second voltages are obtained using at least first and second voltage electrodes that are in contact with the borehole casing and said plurality of current electrodes are in contact with the borehole casing.

19. An apparatus, as claimed in claim 17, wherein:
said second portion of the borehole casing corresponds to said first portion of the borehole casing.

20. A method, as claimed in claim 12, wherein:
said step (f) includes processing said first and second voltages above said borehole casing top.

21. An apparatus, as claimed in claim 17, wherein:
said processor is located above the borehole casing top.

22. An apparatus, as claimed in claim 17, wherein:
said second circuitry further includes at least a first switch and a first conducting line in electrical communication with said first amplifier.

* * * * *